US012783909B2

(12) United States Patent
Wei et al.

(10) Patent No.: US 12,783,909 B2
(45) **Date of Patent: *Nov. 3, 2026**

(54) PROMPTING MACHINE-LEARNED MODELS USING CHAINS OF THOUGHT

(71) Applicant: Google LLC, Mountain View, CA (US)

(72) Inventors: Jason Weng Wei, Mountain View, CA (US); Dengyong Zhou, Redmond, WA (US); Dale Eric Schuurmans, Edmonton (CA); Quoc V. Le, Sunnyvale, CA (US); Maarten Paul Bosma, Cupertino, CA (US); Ed Huai-Hsin Chi, Palo Alto, CA (US); Olivier Jean Andrè Bousquet, Zürich (CH); Le Hou, South Setauket, NY (US); Nathan Kemp Sekiguchi Scales, Baar (CH); David J. Bieber, New York, NY (US); Charles Aloysius Sutton, Santa Clara, CA (US); Nathanael Martin Schärli, Pittsburgh, PA (US); Augustus Quadrozzi Odena, San Francisco, CA (US); Sharan Ajit Narang, San Francisco, CA (US); Guy Gur-Ari Krakover, Palo Alto, CA (US); Aakanksha Chowdhery, Santa Clara, CA (US); Aitor Lewkowycz, San Jose, CA (US); Jiageng Luan, San Francisco, CA (US); David Martin Dohan, San Francisco, CA (US); Henryk Michalewski, Oxfordshire (GB); Jacob Austin, New York, NY (US); Anders Johan Andreassen, Princeton, NJ (US); Maxwell Isaac Nye, San Francisco, CA (US); Xuezhi Wang, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 1077 days.

This patent is subject to a terminal disclaimer.

(21) Appl. No.: 17/881,746

(22) Filed: Aug. 5, 2022

(65) Prior Publication Data

US 2023/0394328 A1 Dec. 7, 2023

Related U.S. Application Data

(60) Provisional application No. 63/348,637, filed on Jun. 3, 2022.

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS 11,574,131 B2 2/2023 Shazeer et al.
11,960,848 B2 4/2024 Shazeer et al.
(Continued)

OTHER PUBLICATIONS

Bansal et al., "A Neural Question Answering System for Basic Questions about Subroutines," arXiv:2101.03999v1, Jan. 11, 2021, 12 pgs. (Year: 2021).*
(Continued)

*Primary Examiner* — Eric J. Bycer
(74) *Attorney, Agent, or Firm* — DORITY & MANNING, P.A.

(57) ABSTRACT

Example embodiments of aspects of the present disclosure provide an example computer-implemented method for improved prompting of a machine-learned model. The example method can include obtaining an instructive
(Continued)

sequence descriptive of an instructive query, an instructive response, and an instructive trace of intermediate states from the instructive query to the instructive response. The example method can include inputting, to a machine-learned model, the instructive sequence and an operative query, wherein the machine-learned model is configured to process the operative query with attention over the instructive sequence. The example method can include generating, using the machine-learned model and responsive to the operative query, an operative response.

30 Claims, 13 Drawing Sheets

(56) References Cited

U.S. PATENT DOCUMENTS

2024/0220734 A1 7/2024 Shazeer et al.
2024/0256786 A1 8/2024 Shazeer et al.

OTHER PUBLICATIONS

Madaan et al., "Memory-assisted prompt editing to improve GPT-3 after deployment," arXiv:2201.06009v4, Mar. 16, 2022, 23 pgs. (Year: 2022).*
Wang et al., "Shepherd Pre-trained Language Models to Develop a Train of Thought: An Iterative Prompting Approach," arXiv: 2203.08383v1, Mar. 16, 2022, 13 pgs. (Year: 2022).*
Ahn et al, "Do as I Can, Not as I Say: Grounding Language in Robotic Affordances", arXiv:2204.01691v2, Aug. 16, 2022, 34 pages.
Amini et al, "MathQA: Towards Interpretable Math Word Problem Solving with Operation-Based Formalisms", arXiv:1905.13319v1, May 30, 2019, 11 pages.
Andor et al, "Giving BERT a Calculator: Finding Operations and Arguments with Reading Comprehension", arXiv:1909.00109v2, Sep. 12, 2019, 10 pages.
Andreas et al, "Learning with Latent Language", arXiv:1711.00482v1, Nov. 1, 2017, 16 pages.
Austin et al, "Program Synthesis with Large Language Models", arXiv:2108.07732v1, Aug. 16, 2021, 34 pages.
Bostrom et al, "Flexible Generation of Natural Language Deductions", arXiv:2104.08825v2, Sep. 9, 2021, 13 pages.
Brown et al, "Language Models are Few-Shot Learners", arXiv:2005.14165v4, Jul. 22, 2020, 75 pages.
Cai et al, "Making Neural Programming Architectures Generalize via Recursion", arXiv:1704.06611v1. Apr. 21, 2017, 20 pages.
Camburu et al, "e-SNLI: Natural Language Inference with Natural Language Explanations", arXiv:1812.01193v2, Dec. 6, 2018, 13 pages.
Chen et al, "Can Rationalization Improve Robustness?", arXiv:2204.11790v2, May 3, 2022, 14 pages.
Chen et al, "Evaluating Large Language Models Trained on Code", arXiv:2107.03374v2, Jul. 14, 2021, 35 pages.
Chen et al, "Neural Symbolic Reader: Scalable Integration of Distributed and Symbolic Representations for Reading Comprehension", International Conference on Learning Representations, Apr. 26-May 1, 2020, Virtual, 16 pages.
Chiang et al, "Semantically-Aligned Equation Generation for Solving and Reasoning Math Word Problems", arXiv:1811.00720v2, Jun. 9, 2019, 13 pages.
Chowdhery et al, "PaLM: Scaling Language Modeling with Pathways", arXiv:2204.02311v3, Apr. 19, 2022, 83 pages.
Clark et al, "Transformers as Soft Reasoners Over Language", arXiv:2002.05867v2, May 5, 2020, 15 pages.
Cobbe et al, "Training Verifiers to Solve Math Word Problems", arXiv:2110.14168v2, Nov. 18, 2021, 22 pages.
Devlin et al, "BERT: Pre-Training of Deep Bidirectional Transformers for Language Understanding", arXiv:1810.04805v2, May 24, 2019, 16 pages.
Dong et al, "Neural Logic Machines", arXiv:1904.11694v1, Apr. 26, 2019, 22 pages.
Dua et al, "Benefits of Intermediate Annotations in Reading Comprehension", Association for Computational Linguistics, Jul. 5-10, 2020, Virtual, pp. 5627-5634.
Geva et al, "Did Aristotle use a Laptop? A Question Answering Benchmark with Implicit Reasoning Strategies", arXiv:2101.02235v1, Jan. 6, 2021, 15 pages.
Gu et al, "DREAM: Uncovering Mental Models Behind Language Models" arXiv:2112.08656v1. Dec. 16, 2021, 12 pages.
Hancock et al, "Training Classifiers with Natural Language Explanations", arXiv:1805.03818v4, Aug. 25, 2018, 12 pages.
Hase et al, "When Can Models Learn from Explanations? A Formal Framework for Understanding the Roles of Explanation Data", arXiv:2102.02201v2, Feb. 10, 2021, 25 pages.
Hendrycks et al, "Measuring Mathematical Problem Solving with the Math Dataset", arXiv:2103.03874v2, Nov. 8, 2021, 22 pages.
Hosseini et al, 2014. Learning to Solve Arithmetic Word Problems with Verb Categorization, Conference on Empirical Methods in Natural Language Processing, Oct. 25-29, 2014, Doha, Qatar, 11 pages.
Jie et al, "Learning to Reason Deductively: Math Word Problem Solving as Complex Relation Extraction", arXiv:2203.10316v3, Apr. 25, 2022, 12 pages.
Kaplan et al, "Scaling Laws for Neural Language Models", arXiv:2001.08361v1, Jan. 23, 2020, 30 pages.
Lampinen et al, "Can Language Models Learn from Explanations in Context?", arXiv:2204.02329v3, May 20, 2022, 29 pages.
Lan et al., "MWPToolkit: An Open-Source Framework for Deep Learning-Based Math Word Problem Solvers", arXiv:2109.00799v2, Sep. 18, 2021, 9 pages.
Lester et al, "The Power of Scale for Parameter-Efficient Prompt Tuning", arXiv:2104.08691v2. Sep. 2, 2021, 15 pages.
Lev et al, "Solving Logic Puzzles: From Robust Processing to Precise Semantics", Workshop on Text Meaning and Interpretation, Jul. 2004, Barcelona, Spain, 8 pages.
Li et al, "Prefix-Tuning: Optimizing Continuous Prompts for Generation", arXiv:2101.00190v1, Jan. 1, 2021, 15 pages.
Liang et al, "Explainable Multi-Hop Verbal Reasoning Through Internal Monologue", Conference of the North American Chapter of the Association for Computational Linguistics: Human Language Technologies, Jun. 2021, Virtual, pp. 1225-1250.
Ling et al, "Program Induction by Rationale Generation: Learning to Solve and Explain Algebraic Word Problems", arXiv:1705.04146v3, Oct. 23, 2017, 10 pages.
Liu et al, "Pre-Train, Prompt, and Predict: A Systematic Survey of Prompting Methods in Natural Language Processing", arXiv:2107.13586v1, Jul. 28, 2021, 46 pages.
Majumder et al, "Rationale-Inspired Natural Language Explanations with Commonsense", arXiv:2106.13876v3, Jun. 29, 2022, 16 pages.
Mao et al, "Grammar-Based Grounded Lexicon Learning", Conference on Neural Information Processing Systems, Dec. 6-14, 2021, Virtual, 14 pages.
Marasovic et al, "Few-Shot Self-Rationalization with Natural Language Prompts", arXiv:2111.08284v2. Apr. 26, 2022, 15 pages.
Min et al, "Rethinking the Role of Demonstrations: What Makes In-Context Learning Work?" arXiv:2202.12837v1, Feb. 25, 2022, 14 pages.
Mohammed Saeed et al "RuleBERT: Teaching Soft Rules to Pre-Trained Language Models", arXiv:2109.13006v1, Sep. 24, 2021, 17 pages.
Narang et al, "WT5?! Training Text-to-Text Models to Explain Their Predictions", arXiv:2004.14546v1. Apr. 30, 2020, 16 pages.
Nye et al, "Show your Work: Scratchpads for Intermediate Computation with Language Models", arXiv:2112.00114v1. Nov. 30, 2021, 16 pages.
"Koncel-Kedziorski", "MAWPS: A Math Word Problem Repository", Conference of the North American Chapter of the Association

(56) References Cited

OTHER PUBLICATIONS for Computational Linguistics: Human Language Technologies, Jun. 12-17, 2016, San Diego, California, United States, pp. 1152-1157.
Ouyang et al, "Training Language Models to Follow Instructions with Human Feedback", arXiv:2203.02155v1, Mar. 4, 2022, 68 pages.
Patel et al, "Are NLP Models Really Able to Solve Simple Math Word Problems?", arXiv:2103.07191v2, Apr. 15, 2021, 16 pages.
Peters et al, "Deep Contextualized Word Representations", arXiv: 1802.05365v2, Mar. 22, 2018, 15 pages.
Pi et al, "Reasoning like Program Executors", arXiv:2201.11473v1, Jan. 27, 2022, 17 pages.
Piekos et al, "Measuring and Improving BERT's Mathematical Abilities by Predicting the Order of Reasoning", arXiv:2106.03921v1, Jun. 7, 2021, 13 pages.
Rae et al, "Scaling Language Models: Methods, Analysis & Insights from Training Gopher", arXiv:2112.11446v2, Jan. 21, 2022, 120 pages.
Raffel et al, "Exploring the Limits of Transfer Learning with a Unified Text-to-Text Transformer", arXiv: 1910.10683v3, Jul. 28, 2020, 67 pages.
Rajagopal et al., "SelfExplain: A Self-Explaining Architecture for Neural Text Classifiers", arXiv:2103.12279v2, Sep. 8, 2021, 16 pages.
Rajanin et al, Explain Yourself! Leveraging Language Models for Commonsense Reasoning, arXiv:1906.02361v1, Jun. 6, 2019, 11 pages.
Ran et al, "NumNet: Machine Reading Comprehension with Numerical Reasoning", arXiv:1910.06701v1. Oct. 15, 2019, 11 pages.
Recchia, "Teaching Autoregressive Language Models Complex Tasks by Demonstration", arXiv:2109.02102v1, Dec. 3, 2021, 15 pages.
Reif et al, "A Recipe for Arbitrary Text Style Transfer with Large Language Models", arXiv:2109.03910v4, Mar. 31, 2022, 12 pages.
Reynolds et al, "Prompt Programming for Large Language Models: Beyond the Few-Shot Paradigm", arXiv:2102.07350v1, Feb. 15, 2021, 10 pages.
Roy et al, "Solving General Arithmetic Word Problems", arXiv:1608.01413v2, Aug. 20, 2016, 10 pages.
Sanh et al, "Multitask Prompted Training Enables Zero-Shot Task Generalization", arXiv:2110.08207v3, Mar. 17, 2022, 216 pages.
Scao et al, "How Many Data Points is a Prompt Worth?" arXiv:2103.08493v2, Apr. 6, 2021, 10 pages.
Shen Yun Miao, Chao Chun Liang, and Keh Yih Su. 2020. A Diverse Corpus for Evaluating and Developing English Math Word Problem Solvers, Association for Computational Linguistics, Jul. 5-10, 2020, Virtual, pp. 975-984.
Srivastava et al, "Beyond the Imitation Game: Measuring and Extrapolating the Capabilities of Language Models", arXiv:2206.04615v2, Jun. 10, 2022, 100 pages.
Talmor et al, "CommonsenseQA 2.0: Exposing the Limits of AI through Gamification", arXiv:2201.05320v1, Jan. 14, 2022, 14 pages.
Talmor et al, "CommonsenseQA: A Question Answering Challenge Targeting Commonsense Knowledge", arXiv:1811.00937v2, Mar. 15, 2019, 10 pages.
Talmor et al, "Leap-of-Thought: Teaching Pre-Trained Models to Systematically Reason Over Implicit Knowledge", arXiv:2006.06609v3, Nov. 14, 2020, 13 pages.
Thoppilan et al, "LaMDA: Language Models for Dialog Applications", arXiv:2201.08239v3, Feb. 10, 2022, 47 pages.
Wang et al, "Benchmarking Generalization via In-Context Instructions on 1,600+ Language Tasks", arXiv:2204.07705v2. Apr. 29, 2022, 22 pages.
Wang et al, "Self-Consistency Improves Chain of Thought Reasoning in Language Models", arXiv:2203.11171v2, Apr. 6, 2022, 18 pages.
Wei et al, "Finetuned Language Models are Zero-Shot Learners", arXiv:2109.01652v5, Feb. 8, 2022, 46 pages.
Wiegreffe et al, "Measuring Association Between Labels and Free-Text Rationales", Conference on Empirical Methods in Natural Language Processing, Nov. 2021, Virtual, pp. 10266-10284.
Wiegreffe et al, "Teach Me to Explain: A Review of Datasets for Explainable NLP", arXiv:2102.12060v4, Dec. 7, 2021, 29 pages.
Wiegreffe, "Reframing Human-AI Collaboration for Generating Free-Text Explanations", arXiv:2112.08674v2, May 4, 2022, 27 pages.
Wu et al, "AI Chains: Transparent and Controllable Human-AI Interaction by Chaining Large Language Model Prompts", arXiv:2110.01691v3, Mar. 17, 2022, 22 pages.
Wu et al, "PromptChainer: Chaining Large Language Model Prompts through Visual Programming", arXiv:2203.06566v1, Mar. 13, 2022, 10 pages.
Yan et al, "Neural Execution Engines: Learning to Execute Subroutines", arXiv:2006.08084v3, Oct. 22, 2020, 21 pages.
Yao et al, "Refining Language Models with Compositional Explanations", arXiv:2103.10415v3, Dec. 31, 2021, 19 pages.
Yordanov et al, "Few-Shot Out-of-Domain Transfer Learning of Natural Language Explanations", arXiv:2112.06204v1, Dec. 12, 2021, 20 pages.
Zaidan et al, "Using "Annotator Rationales" to Improve Machine Learning for Text Categorization", Conference of the North American Chapter of the Association for Computational Linguistics, Apr. 2007, Rochester, New York, United States, pp. 260-267.
Zaremba et al, "Learning to Execute", arXiv:1410.4615v3, Feb. 19, 2015, 25 pages.
Zelikman et al, "STaR: Bootstrapping Reasoning with Reasoning", arXiv:2203.14465v2, May 20, 2022, 30 pages.
Zhao et al, "Calibrate Before Use: Improving Few-Shot Performance of Language Models", arXiv:2102.09690v2, Jun. 10, 2021, 15 pages.
Zhou et al, "Towards Interpretable Natural Language Understanding with Explanations as Latent Variables", arXiv:2011.05268v3, May 26, 2022, 16 pages.
International Preliminary Report on Patentability for PCT/US2023/023918, mailed on Dec. 12, 2024, 11 pages.
International Search Report and Written Opinion for Application No. PCT/US2023/023918, mailed Aug. 2, 2023, 16 pages.
Wei et al., "Chain-of-Thought Prompting Elicits Reasoning in Large Language Models", Advances in Neural Information Processing Systems 35, 2022, pp. 24824-24837.
U.S. Appl. No. 18/603,756, filed Mar. 13, 2024, Machine-Learned Language Models Which Generate Intermediate Textual Analysis in Service of Contextual Text Generation.
U.S. Appl. No. 18/603,734, filed Mar. 13, 2024, Machine-Learned Language Models Which Generate Intermediate Textual Analysis in Service of Contextual Text Generation.
Office Action mailed Feb. 5, 2026 for U.S. Appl. No. 18/160,776, 97 pages.
Clark et al., "Think You Have Solved Question Answering? Try ARC, the AI2 Reasoning Challenge", arXiv:1803.05457v1, Mar. 14, 2018, 10 pages.
Roy et al., "Reasoning about Quantities in Natural Language", Transactions of the Association for Computational Linguistics, vol. 3, 2015, 14 pages.

* cited by examiner

PROMPTING MACHINE-LEARNED MODELS USING CHAINS OF THOUGHT

RELATED APPLICATIONS

This application claims the benefit of and priority to U.S. Provisional Patent Application No. 63/348,637, filed Jun. 3, 2022. U.S. Provisional Patent Application No. 63/348,637 is hereby incorporated by reference herein in its entirety.

FIELD

The present disclosure relates generally to the control of machine-learned models. More particularly, the present disclosure relates to constructing prompting inputs for machine-learned models.

BACKGROUND

Machine-learned models can provide various functionality. Such models can be trained to perform various tasks. Already-trained models can be further instructed to perform particular tasks by providing inputs to the model with rich context that prompts the model to behave in a desired fashion.

SUMMARY

Aspects and advantages of embodiments of the present disclosure will be set forth in part in the following description, or can be learned from the description, or can be learned through practice of the embodiments.

In one example aspect, example embodiments of the present disclosure provide for an example computer-implemented method for improved prompting of a machine-learned model. The example method includes obtaining, by a computing system including one or more processors, an instructive sequence descriptive of an instructive query, an instructive response, and an instructive trace of intermediate states from the instructive query to the instructive response. The example method includes inputting, by the computing system and to a machine-learned model, the instructive sequence and an operative query, wherein the machine-learned model is configured to process the operative query with attention over the instructive sequence. The example method includes generating, by the computing system, using the machine-learned model and responsive to the operative query, an operative response.

In one example aspect, example embodiments of the present disclosure provide for one or more example memory devices storing computer-readable instructions for improved prompting of a machine-learned model, the instructions executable to cause one or more processors to perform example operations. The example operations include obtaining an instructive sequence descriptive of an instructive query, an instructive response, and an instructive trace of intermediate states from the instructive query to the instructive response. The example operations include inputting, to a machine-learned model, the instructive sequence and an operative query, wherein the machine-learned model is configured to process the operative query with attention over the instructive sequence. The example operations include generating, using the machine-learned model, a plurality of operative responses. The example operations include determining a consistency metric based on a sample of the plurality of operative responses. The example operations include determining an operative response based on the consistency metric.

In one example aspect, example embodiments of the present disclosure provide for an example computing system for improved prompting of a machine-learned model. The example system includes one or more processors and one or more memory devices storing computer-readable instructions executable to cause the one or more processors to perform example operations. In the example system, the example operations include obtaining an instructive sequence descriptive of an instructive query, an instructive response, and an instructive trace of intermediate states from the instructive query to the instructive response. In the example system, the example operations include inputting, to a machine-learned model, the instructive sequence and an operative query, wherein the machine-learned model is configured to process the operative query with attention over the instructive sequence. In the example system, the example operations include generating, using the machine-learned model, a plurality of operative responses. In the example system, the example operations include determining a consistency metric based on a sample of the plurality of operative responses. In the example system, the example operations include determining an operative response based on the consistency metric.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
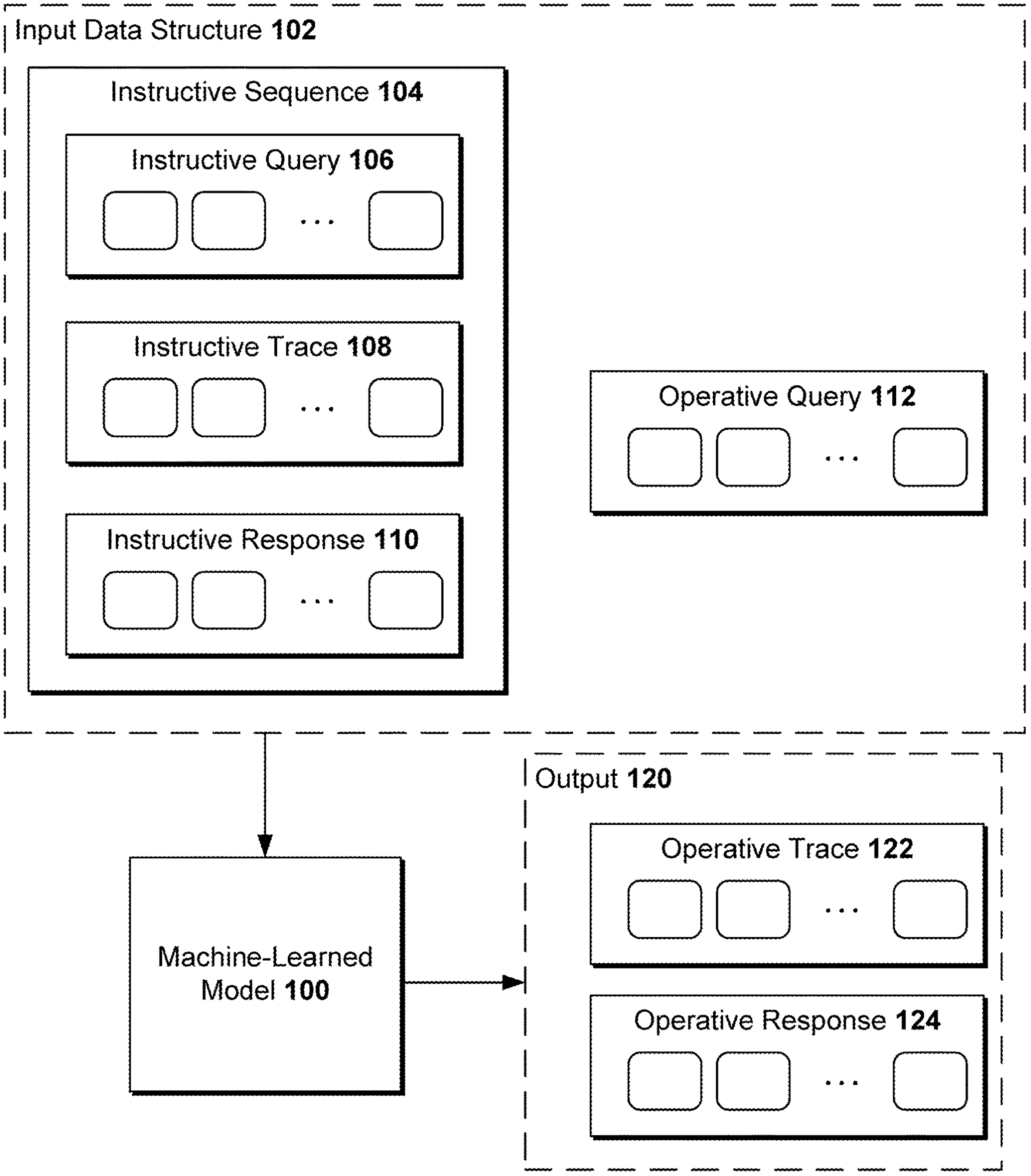
FIG. 1 depicts a block diagram of an example input data structure and corresponding example out for chain of thought prompting according to example aspects of some embodiments of the present disclosure.

Reference numerals that are repeated across plural figures are intended to identify the same features in various implementations.

DETAILED DESCRIPTION

Overview

Generally, the present disclosure is directed to improved techniques for prompting machine-learned models to perform various tasks. Example embodiments of the present disclosure relate to prompting a machine-learned model using a "chain of thought" that traces the reasoning used to generate an output responsive to a given input. For example, a machine-learned model can be trained (e.g., in pre-training, fine tuning, etc.) to learn relationships between inputs. For instance, a machine-learned model can be trained to learn relationships between terms in an input query. Prompting a machine-learned model can include providing an instructive input query and an instructive output response before an operative query of interest. By also providing an instructive trace explaining the sequence of reasoning steps or logical states between the instructive input query and the instructive output response, example prompts according to aspects of the present disclosure can better leverage the network of learned associations to communicate more instructive context with a given prompt.

For example, traditional model input structures can be suitable for some tasks. For instance, scaling up the size of language models has led to improvements in performance and sample efficiency. For instance, language models at the scale of 100B or more parameters have achieved strong performance on natural language processing tasks such as sentiment analysis and topic classification, even in few-shot and zero-shot settings.

However, on other tasks, even large models can struggle using traditional input and control techniques. For instance, using traditional input and control techniques, even large language models can struggle with tasks that involve slow and deliberate thinking (e.g., "system-2 tasks," tasks with multiple steps, etc.), and includes logical, mathematical, and commonsense reasoning tasks, among others. This difficulty can arise even when models are scaled into the hundreds of billions of parameters. For example, a pre-trained GPT-3 model can struggle to perform few-shot addition on numbers with greater than three digits. Similarly, existing large-scale language model implementations can struggle to predict the result of executing code, even code which is a solution to a programming task the model is generally able to solve. And standard recurrent and graph neural network implementations can fail to systematically generalize when predicting the output of simple programs with loops.

Advantageously, example techniques of the present disclosure can enable machine-learned models to decompose a posed query or problem into intermediate steps that are solved individually. In some examples, this technique enables the model to resolve the intermediate steps instead of solving an entire multi-hop problem in a single forward pass, proving capacity to focus the model's processing power on more challenging intermediate steps instead of spreading the compute resources thin over all steps at once. Examples of this technique enable the model to resolve the intermediate steps in concert with resolution of the desired output value, leveraging the richer context of the reasoning trace to guide and refine the desired output value.

For example, in some embodiments, machine-learned models can be instructed to generate such chains of thought as intermediate traces. For example, single-shot or few-shot prompting using a number of instructive examples can provide a pattern that the model can understand and follow. In some examples, including an instructive trace with the instructive examples enables the model to generate its own trace when processing a query.

In some embodiments, a machine-learned model can output a single query response and trace thereof. In some embodiments, a machine-learned model can output a plurality of responses (and corresponding traces). The plurality of responses can be leveraged to determine a consistency metric. For instance, a consistency metric can be evaluated across a sampling of diverse traces (e.g., representing diverse approaches to resolving the query) and corresponding responses. For example, a set of outputs with diverse reasoning strategies can be polled to obtain a majority or plurality "vote" on the ultimate answer. In this manner, the model output can self-corroborate its "rationale" to improve the robustness of model output and improve accuracy of the ultimate answers. Compared to some prior decoding methods, a self-consistency technique according to the present disclosure can avoid the repetitiveness that can affect greedy sampling, while mitigating the stochasticity of a single random generation. Compared to prior generate-then re-rank approaches, self-consistency can avoid using a specially-trained re-ranker and can have a faster runtime (e.g., given the same number of decodes).

In some embodiments, a chain of thought can span multiple queries processed by the machine-learned model. For instance, a target query may include a complex or multi-part question. The target query can be broken down or reduced into one or more query components (e.g., using prompting or other methods, using the same or a different model, etc.). The query components can then be recursively processed by the model. For instance, a first query component can be processed in view of an initial instructive sequence (e.g., a chain-of-thought prompt as described herein, etc.). In some embodiments, each successive query component can be processed in view of prior query components and responses thereto. For instance, in this manner, the machine-learned model can self-construct an updated instructive sequence with each recursion to leverage its own prior work to build toward an ultimate response to the target query.

Example embodiments of input data structures according to aspects of the present disclosure can provide for a number of technical effects and benefits. In some embodiments, causing a machine-learned model to generate a chain of thought according to aspects of the present disclosure can provide an interpretable window into the behavior of the model, suggesting how it might have arrived at a particular answer and providing opportunities to debug where the reasoning path went wrong. Input data structures configured according to example embodiments of the present disclosure can unlock previously unrealized capabilities to understand, audit, debug, and improve the functionality of computing devices executing machine-learned models.

In some embodiments, input data structures configured according to example embodiments of the present disclosure can enable machine-learned models to be used for cross-domain tasks. For instance, a machine-learned model trained on a textual corpus may contain weights which encode a number of semantic associations between concepts. Using an input data structure configured according to the present disclosure, such a model can provide utility in resolving queries for any problem that can be formulated in a textual expression, even if the model was not trained to perform such a problem type (e.g., mathematical problems, symbolic manipulation more generally, etc.). In this manner, for example, the presently disclosed input data structures unlock the full computational power of machine-learned models to solve new problems outside of a training domain.

In some embodiments, input data structures configured according to example embodiments of the present disclosure can provide for an improved human-machine interface for inputting and processing queries. For instance, in the context of machine-learned language models, input data structures according to the present disclosure enable a user to control the model to perform complex calculations or other reasoning tasks by inputting only simple instructive strings. In this manner, the technological power of complex machine-learned language models can be made more accessible to non-technical users who may lack requisite training or other resources to, for example, fine-tune a multibillion-parameter model to perform a particular task. By improving the interface for such models, example embodiments of the present disclosure improve the capabilities of computing devices executing the models in such implementations by providing for new pathways of interaction with the models.

In some embodiments, input data structures configured according to example embodiments of the present disclosure can provide for decreased usage of computing resources to adapt a model to a given task. For instance, traditional approaches to instructing a machine-learned model to perform a given task include updating model parameter(s) based on an objective evaluated over some training input. Such an update procedure can be extremely resource intensive (e.g., computational resources, electrical resources, etc.) and may be cost-prohibitive (e.g., energy cost, time cost, etc.). In contrast, input data structures according to the present disclosure can provide for adaptation of large models (e.g., billions of parameters, trillions of parameters, etc.) without necessarily requiring additional training. For instance, input data structures according to the present disclosure can provide for improvements in model performance with just one or more instructive examples and instructive traces.

With reference now to the Figures, example embodiments of the present disclosure will be discussed in further detail.

FIG. 1 depicts an example configuration of prompting a machine-learned model 100 according to aspects of the present disclosure. An input data structure 102 can include an instructive sequence 104 that contains an instructive query 106, an instructive trace 108, and an instructive response 110. Multiple different instructive sequences 104 can be provided in the input data structure 102. The input data structure 102 can also include an operative query 112. The instructive query 106, instructive trace 108, instructive response 110, and operative query 112 can contain embedded values. For instance, an embedded value can include a tokenized representation of an input string (e.g., text string, symbolic string, etc.). In some embodiments, an embedded value can include a tokenized representation of other data (e.g., image data, etc.).

In some embodiments, the machine-learned model 100 includes a neural network trained to understand and interpret inputs to generate an output. For instance, in some embodiments, the machine-learned model 100 includes a neural network trained to understand and interpret text or other symbolic inputs to extract semantic meaning therefrom, including to respond to instructions provided in such inputs. In some embodiments, the machine-learned model 100 includes a neural network trained to understand and interpret images or other data inputs more generally to extract meaning therefrom, including to respond to instructions provided in such inputs.

In general, the techniques and input data structures of the present disclosure can be implemented using and adapted for a variety of model architectures. In some embodiments, the machine-learned model 100 is configured to process the operative query 112 with attention over the instructive sequence 104. For instance, in some embodiments, the machine-learned model 100 can include one or more transformer architectures (e.g., encoder only, decoder only, encoder and decoder, etc.).

In some embodiments, the instructive query 106 can present substantially any type of problem, question, or task to be performed. For instance, the instructive query 106 can include substantially any problem capable of being explained, reasoned, or otherwise expressed with symbols, images, language, etc. For example, the instructive query 106 can include mathematical queries, logic queries, knowledge queries, generative queries, summary queries, analytics queries, retrieval queries, image processing queries, etc.

In some embodiments, the instructive trace 108 can include one or more intermediate states from the instructive query 106 to the instructive response 110. For example, intermediate states can include intermediate values associated with component subtasks, declarations of knowns determined (explicitly or implicitly) from the instructive query, logical steps to progress from a problem to a solution, a log of subtasks performed to generate the instructive response 110, etc.

The instructive response 110 can include the fulfillment of the instructive query 106. For instance, in some embodiments of a mathematical instructive query 106, the instructive response 110 can include a numerical solution, an analytical or symbolic solution, etc. In some embodiments, for a knowledge instructive query 106, the instructive response 110 can include returning the requested knowledge, etc.

In some embodiments, the operative query 112 can be of a similar type of query to the instructive query 106. In some embodiments, the operative query 112 can be of a different type of query to the instructive query 106 (e.g., when multiple instructive sequences 104 are provided).

In some embodiments, the instructive query 106 and operative query 112 can contain input flag(s) and output flag(s). For instance, the instructive query 106 can contain an input flag indicating a query start position and an output flag indicating a portion to be generated by the model 100 (e.g., a subsequent portion of the instructive sequence 104).

Based on the input data structure 102, the machine-learned model 100 can generate an output 120. In some embodiments, the output 120 can contain an operative trace 122 and an operative response 124. Generally, the operative response 124 can include a fulfillment of the operative query 112 (e.g., including an expression of an inability to fulfill the query, etc.). In some embodiments, the operative trace 112 can be generated based on a pattern set by one or more instructive traces in the input data structure 102. In some embodiments, the operative response 124 can be generated to relate to the operative trace 122 and the operative query 112 based on a pattern set by the instructive sequence(s) 104.

Figure 2:
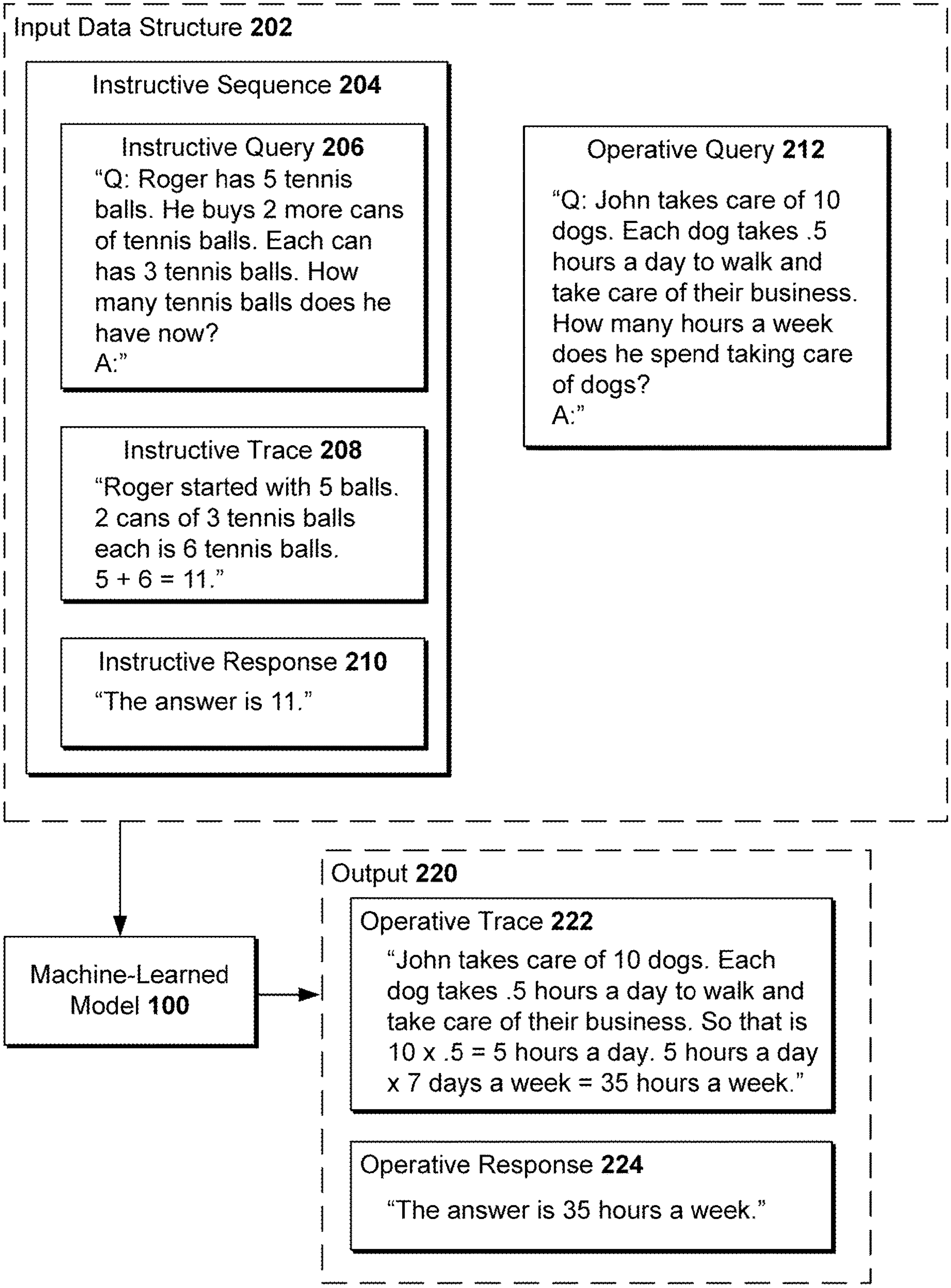
FIG. 2 depicts a block diagram of an example input data structure and corresponding example out for chain of thought prompting according to example aspects of some embodiments of the present disclosure.

FIG. 2 illustrates one example implementation of an input data structure 202 according to aspects of the present disclosure. Instructive sequence 204 can include an instructive query 206 which embeds, represents, or otherwise is descriptive of a query corresponding to the string "Q: Roger has 5 tennis balls. He buys 2 more cans of tennis balls. Each can has 3 tennis balls. How many tennis balls does he have now? A:" In the example instructive query 206, "Q:" can correspond to an input flag indicating the start of an input query. In the example instructive query 206, "A:" can correspond to an output flag indicating the start of a portion to be provided in response to the instructive query 206.

Instructive sequence 204 can include an instructive trace 208 documenting intermediate states from the instructive query 206 to the instructive response 210. For instance, although the direct answer to the posed query is captured by the instructive response 210, "The answer is 11," the instructive trace 208 can capture a series of intermediates (or the "chain of thought") leading to the ultimate answer. For instance, a first intermediate state can include a declaration of a known: "Roger started with 5 balls." A second intermediate state can include a statement of multiplication based on the query values: "2 cans of 3 tennis balls each is 6 tennis balls." A third intermediate state can include a summation step (e.g., optionally numeric, in natural language, etc.): "5+6=11."

Operative query 212 can include a query of the same type as at least one instructive query 206. For instance, operative query 212 can include a mathematical word problem of a similar type as the instructive query 206: "Q: John takes care of 10 dogs. Each dog takes 0.5 hours a day to walk and take care of their business. How many hours a week does he spend taking care of dogs? A:"

The machine-learned model 100 can process the input data structure 202 to generate output 220. The output 220 can include an operative trace 222 and an operative response 224. For example, the operative trace 222 can be generated to include one or more intermediate states of reasoning/solution from the operative query 212 to the operative response 224. For instance, a first intermediate state can include a declarative statement of an explicit known, "John takes care of 10 dogs." A second intermediate state can include, for example, another declarative statement of an explicit known, "Each dog takes 0.5 hours a day to walk and take care of their business." A third intermediate state can include, for example, a statement of multiplication based on the explicit knowns, "So that is 10×0.5=5 hours a day." A fourth intermediate state can include, for example, a statement of multiplication based on an implicit known regarding the number of days in a week, "5 hours a day×7 days a week=35 hours a week." In this manner, for example, the operative trace 222 can trace intermediate state(s) from the operative query 212 to the operative response 224.

In some embodiments, the respective responses (e.g., instructive response, operative response) can include the respective traces. For instance, in some examples the desired response is the trace. For instance, example embodiments can be implemented to obtain traces of computer-executable script operation.

Figure 3:
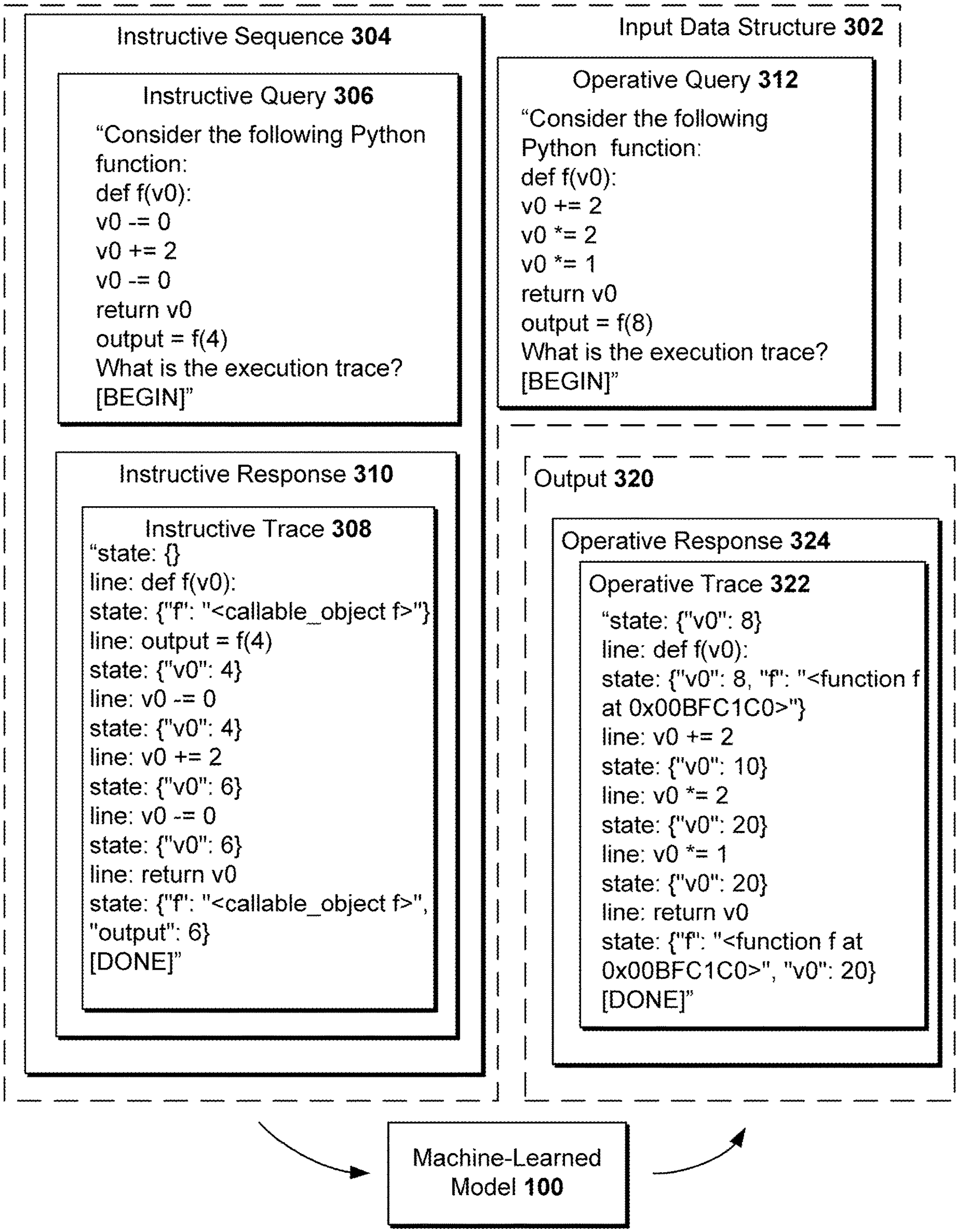
FIG. 3 depicts a block diagram of an example input data structure and corresponding example out for chain of thought prompting according to example aspects of some embodiments of the present disclosure.

FIG. 3 depicts one example implementation of an input data structure 302 in which an instructive sequence 304 contains an instructive query 306 descriptive of a program (e.g., a tokenized representation thereof, etc.). In some examples, the instructive query 306 can include an input flag or an output flag. For instance, FIG. 3 depicts an input flag "Consider the following Python function:" and an output flag "What is the execution trace? [BEGIN]." The instructive trace 308 can form part of the instructive response 310, for example, because fulfillment of the instructive query 304 corresponds to generation of the trace itself. The operative query 312 includes the input flag and output flag along with a new program for tracing. Accordingly, the output 320 generated by the machine-learned model 100 can include an operative trace 322 forming part of the operative response 324.

In some embodiments, the machine-learned model 100 can directly generate an output for fulfilling the operative query. In some embodiments, fulfilling the operative query can include sampling a plurality of outputs to determine a response satisfying a consistency metric.

Figure 4:
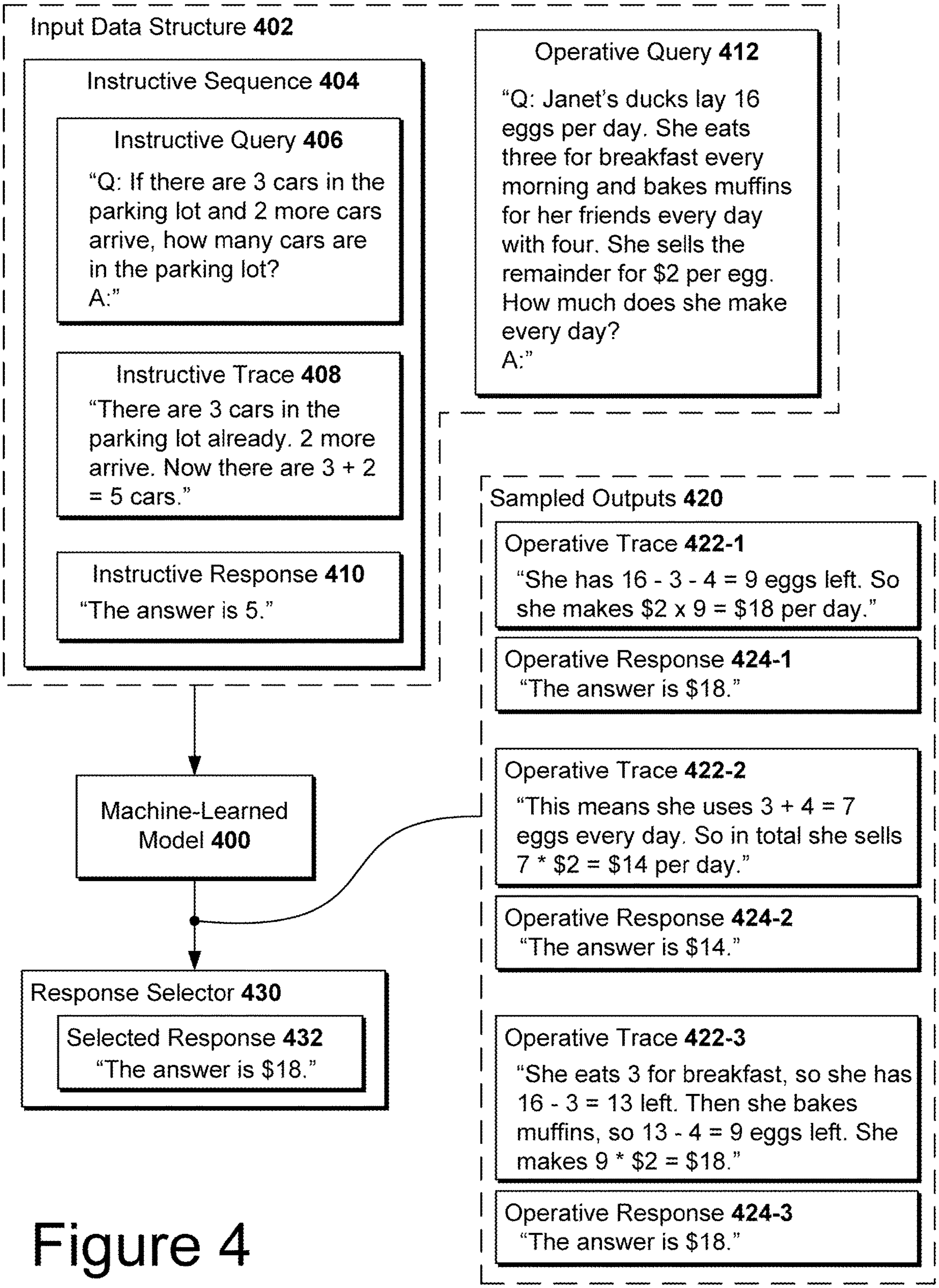
FIG. 4 depicts a block diagram of an example input data structure and corresponding example out for chain of thought prompting according to example aspects of some embodiments of the present disclosure.

FIG. 4 provides an example illustration of an input data structure 402 containing an instructive sequence 404 (including instructive query 406, instructive trace 408, and instructive response 410) and an operative query 412. A machine-learned model 400 can be configured to output a plurality of outputs, including a plurality of operative traces corresponding to a plurality of operative responses. A subset can be sampled, for example, as sampled outputs 420, containing a first sampled output (operative trace 422-1, operative response 424-1), a second sampled output (operative trace 422-2, operative response 424-2), and a third sampled output (operative trace 422-3, operative response 424-3).

In some embodiments, sampled outputs 420 can include a number of outputs sampled from an output layer of a machine-learned model 400. In some embodiments, sampled outputs 420 can be sampled from a probability distribution of the outputs (e.g., of a probability distribution over pairs of traces and responses). In some embodiments, samples are selected according to any suitable sampling scheme. In some embodiments, outputs are randomly sampled. In some embodiments, outputs can be sampled based on a ranked probability (e.g., top-K outputs). In some embodiments, outputs can be sampled for diverse traces.

In some embodiments, a plurality or majority of diverse traces that arrive at the same ultimate resolution can be indicative of a response associated with a higher confidence. Accordingly, in some embodiments, a vote is taken over the sampled outputs (e.g., a plurality vote, a majority vote). For instance, a response selector 430 can determine that the ultimate answer of $18 is indicated in two out of the three sampled outputs 420. In this manner, for example, a selected response 432 of $18 can be obtained.

In some embodiments, evaluation of the consistency metric can be expressed as applying a marginalization over the traces in the conditional probability P (response, trace query) of each output given a query.

Figure 5:
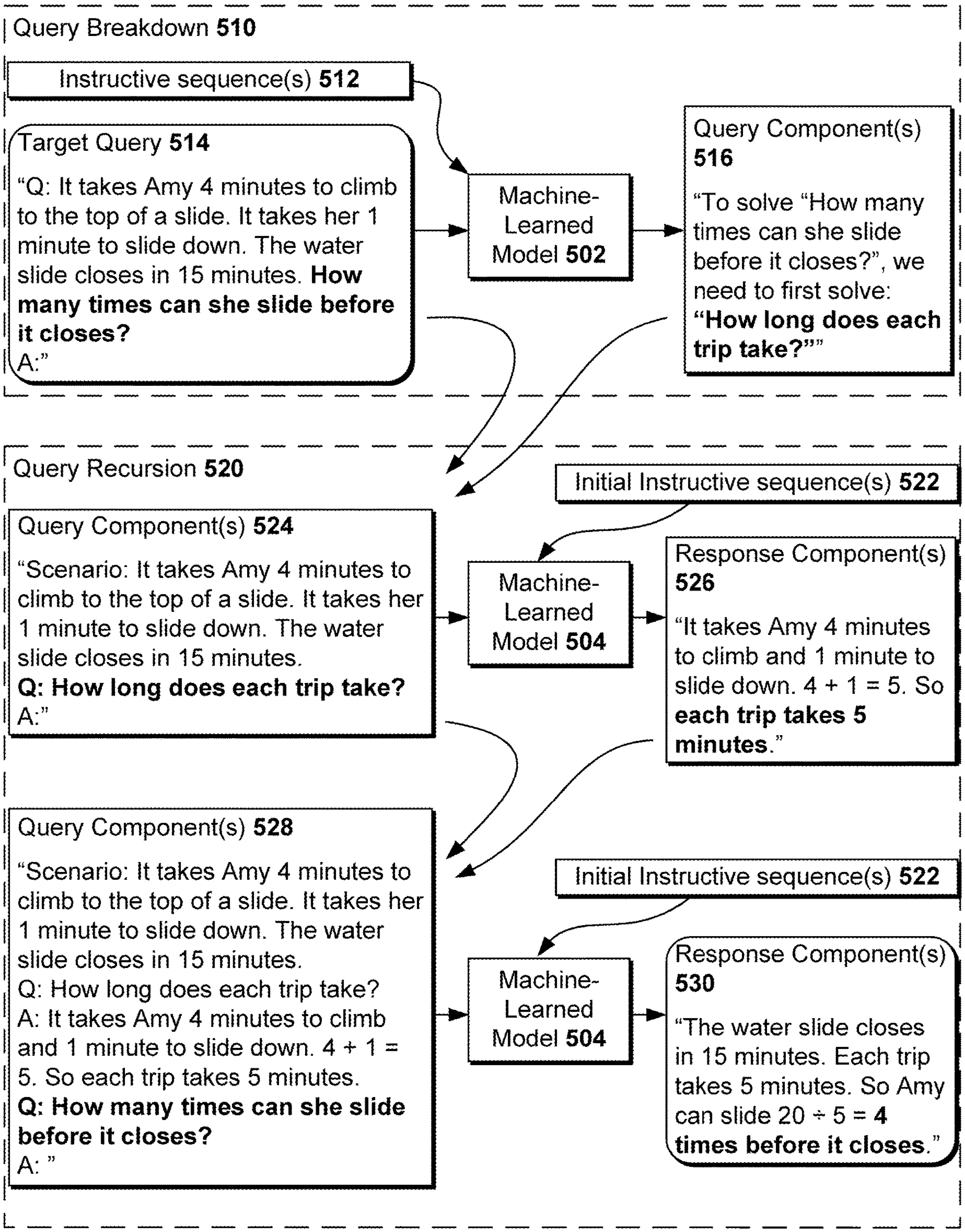
FIG. 5 depicts a block diagram of an example input data structure and corresponding example out for recursive prompting according to example aspects of some embodiments of the present disclosure.

FIG. 5 depicts a block diagram of an example processing flow for performing recursive prompting according to example aspects of the present disclosure. For instance, a machine-learned model pipeline can include one or more models 502, 504. The models 502 and 504 may be the same or different. For instance, any one or both of model(s) 502, 504 can be or contain models 100, 400, etc.

In a query breakdown stage 510, for example, a machine-learned model 502 can reduce a complex problem into one or more component problems. For instance, in some embodiments, the model 502 can be prompted to perform the reduction with one or more instructive sequence(s) 512 (e.g., which can optionally contain instructive traces). In some embodiments, the target query 514 is input to the model 502. For instance, the target query 514 can include a scenario providing context for a question to be answered (e.g., example question emphasized in bold in FIG. 5). The model 502 can generate one or more query components 516. In some embodiments, a query component can include a question that asks for part of an overall solution. In some embodiments, a query component can include a question that asks for a preliminary information component that can be used to obtain an overall solution. In some embodiments, a query component can include a question that asks for a logical complement, corollary, or other related component that may advantageously be easier to resolve.

In a query recursion stage 520, a machine-learned model 504 can recursively process the query components 516 and optionally the initial target query 514. For instance, in some embodiments, the machine-learned model 504 can be prompted with initial instructive sequences 522 to answer the first query component. For instance, query component(s) 524 can include the first query component from query components 516, optionally in combination with the scenario from the target query 514. In some embodiments, the initial instructive sequence(s) 522 can include one or more instructive queries, instructive traces, and instructive responses according to example embodiments of the present disclosure. In some embodiments, the query component(s) can correspond to an operative query (e.g., as described with respect to FIGS. 1 to 4).

On one pass of query recursion 520, the model 504 can generate response component(s) 526 based on the input query component(s) and initial instructive sequence(s) 522. For instance, the response component(s) 526 can include an operative trace and an operative response.

To perform another pass of query recursion 520, a new instructive sequence can be composed from the body of prior knowledge about the problem at hand, which can include new information generated by the model 504. For instance, query component(s) 528 can incorporate query component(s) 524 as well as the response component(s) 526. In this manner, the prior work of the model 504 can effectively become an instructive sequence including instructive queries, instructive traces, and instructive responses. Optionally, the initial instructive sequences 522 can be retained for input together with the query component (s) 528. In this manner, for instance, the model 504 can process additional query component(s) (e.g., the original target query, in bold) by leveraging its prior outputs to generate response component(s) 530.

Query recursion 520 can include, in some embodiments, a plurality of iterations. In some embodiments, the iterative recursion can provide for self-constructed instructive sequences. In some embodiments, this can help the machine-learned model leverage its full power over individual component queries while retaining the ability to build on its own prior work. In some embodiments, this can improve generalization from easy to difficult problems (e.g., easy problems explained via instruction, with inference performed over more difficult problems).

For example, in some embodiments, the query breakdown 510 can provide for an ordered set of query component(s) 516. For instance, in some embodiments, the query component(s) 516 can include an ordering from basic (or foundational) queries to complex (or follow-on) queries. In some embodiments, the set of query components is naturally ordered by appending the task from the original target query to the set of query component(s) 516 generated by the model. In this manner, for instance, the query component(s) 516 can include tractable component queries that can be resolved before tackling the task from the target query 514 itself. FIG. 5 illustrates this example flow.

Example Results: Arithmetic Reasoning

Example results are presented herein for illustration purposes only. It is to be understood that the various configurations presented in the examples are selected for the purpose of illustration and comparison and are not to be interpreted as somehow limiting the scope of disclosure.

First, example results will be discussed with respect to the mathematical word problem type query depicted in FIG. 2. Such queries probe the ability of language models to perform arithmetic reasoning while focusing on problems solvable by elementary school children (ages 6-10). Though such problems can be simple for humans, arithmetic reasoning is a task where language models can exhibit a flat scaling curve (e.g., model performance increase can taper as model size increases). Advantageously, providing a prompt comprising a few instructive traces according to the present disclosure can dramatically improve performance on difficult math word problems for large language models. When scaled to 540B parameters, chain of thought prompting can perform comparably with task-specific finetuned models on a variety of tasks, including surpassing the GSM8K benchmark introduced by Cobbe et al., *Training Verifiers to Solve Math Word Problems*, ARXIV.org (Oct. 27, 2021). For arithmetic reasoning examples discussed herein, the following datasets are used:

(1) SingleOp (Roy et al., *Reasoning about Quantities in Natural Language*, Transactions of the Association for Computational Linguistics, 2015. doi: 10.1162/tacl_a_00118);

(2) SingleEq (Koncel-Kedziorski et al., *MAWPS: A math word problem repository*, In Proceedings of the 2016 Conference of the North American Chapter of the Association for Computational Linguistics: Human Language Technologies, 2016. doi: 10.18653/v1/N16-1136);

(3) AddSub, (Hosseini et al., *Learning to solve arithmetic word problems with verb categorization*, In Proceedings of the 2014 Conference on Empirical Methods in Natural Language Processing (EMNLP), 2014. doi: 10.3115/v1/D14-1058);

(4) ASDiv (Miao et al., *A diverse corpus for evaluating and developing English math word problem solvers*, In Proceedings of the 58th Annual Meeting of the Association for Computational Linguistics, 2020. doi: 10.18653/v1/2020.acl-main.92);

(5) MultiArith, (Roy et al., *Solving general arithmetic word problems*, In Proceedings of the 2015 Conference on Empirical Methods in Natural Language Processing, 2015 doi: 10.18653/v1/D15-1202); and (6) GSM8K (Cobbe et al., *Training Verifiers to Solve Math Word Problems*, ARXIV.org (Oct. 27, 2021)).

As a baseline approach, standard few-shot prompting results are provided in which a language model is given in-context exemplars of input—output pairs before outputting a prediction for a test-time example. Exemplars are formatted as questions and answers before being fed into the model, and the model gives the answer directly.

For the example chain-of-thought prompting results, a set of eight instructive sequences are used. This set is provided in Table 1.

The results are generated by using two collections of dense left-to-right, decoder-only transformer language models. The first collection is based on LaMDA (Thoppilan et al., *Lamda: Language models for dialog applications*, arXiv preprint arXiv:2201.08239), which has models of 422M, 2B, 8B, 68B, and 137B parameters. The second collection of models is PaLM (Chowdhery et al., *PaLM: Scaling language modeling with Pathways*, arXiv preprint arXiv: 2204.02311, 2022), which has sizes of 8B, 62B, and 535B parameters. In the present examples, outputs are sampled from the model using greedy decoding. For LaMDA, results are reported averaged over five random seeds, where each seed had a different randomly shuffled order of exemplars. LaMDA experiments did not show large variance among different seeds, so PaLM results are reported using a single random seed.

Figure 6:
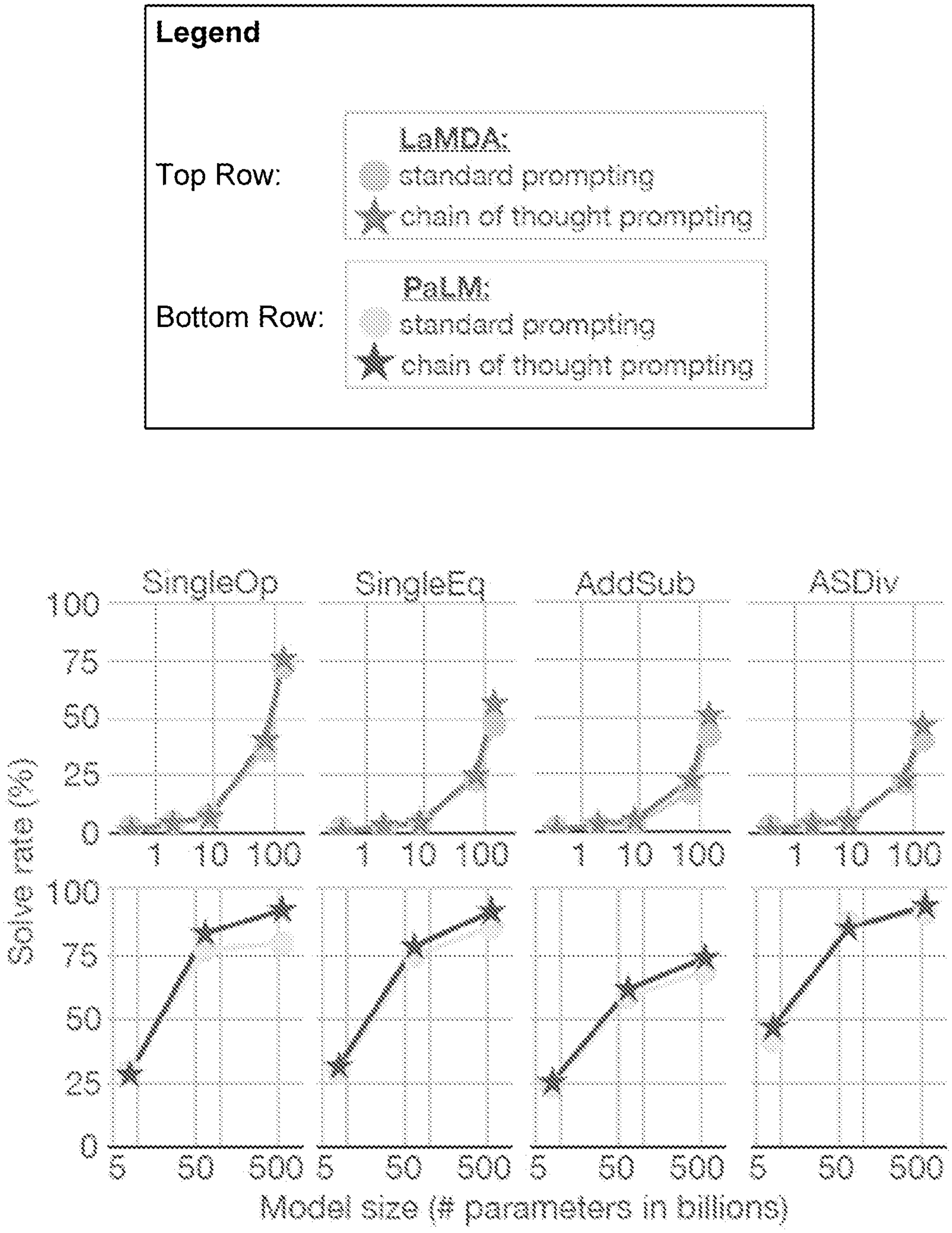
FIG. 6 depicts example results for benchmark comparisons for chain of thought prompting according to example aspects of some embodiments of the present disclosure.
Figure 7:
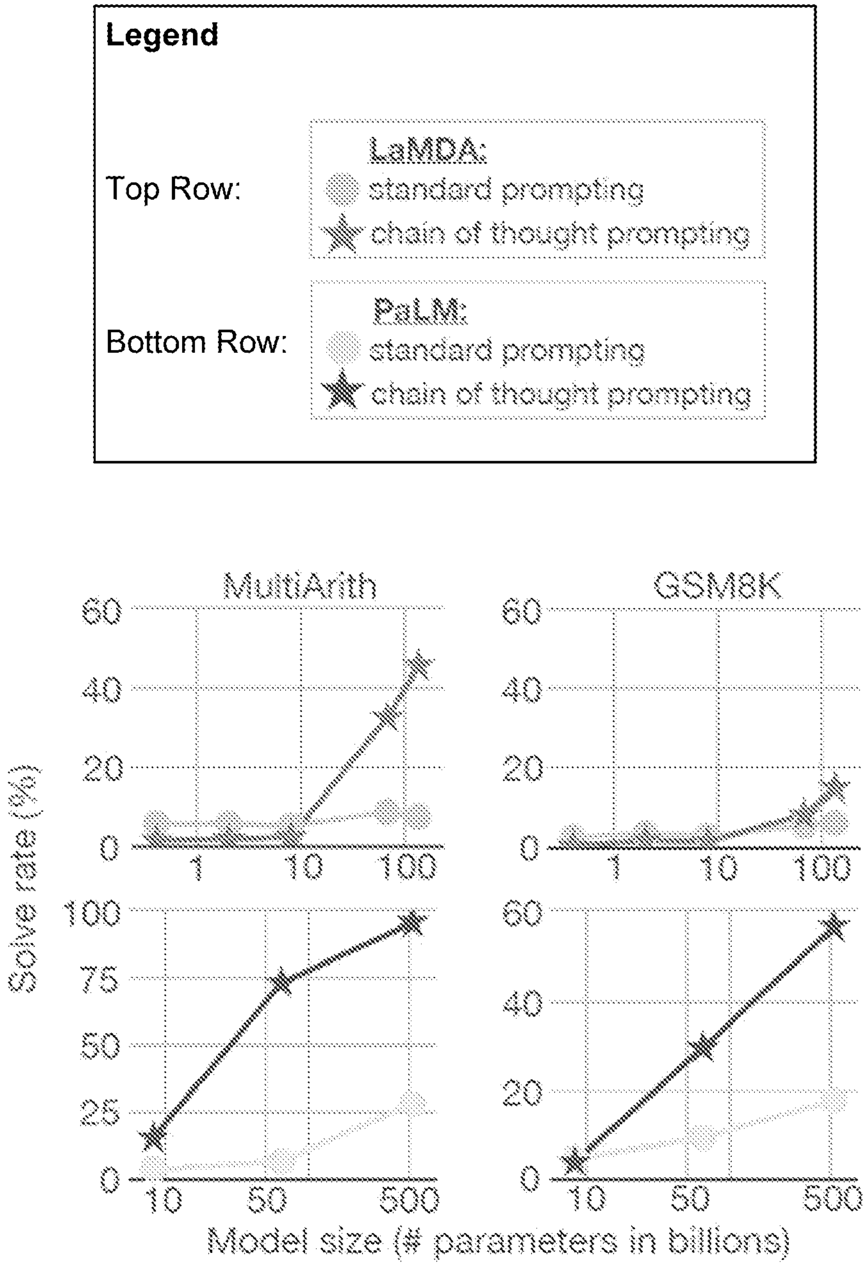
FIG. 7 depicts example results for benchmark comparisons for chain of thought prompting according to example aspects of some embodiments of the present disclosure.

Example results are presented in FIGS. 6 and 7.

TABLE 1

| Instructive Sequences for Arithmetic Reasoning Examples |
|---|
| Q: There are 15 trees in the grove. Grove workers will plant trees in the grove today. After they are done, there will be 21 trees. How many trees did the grove workers plant today? |
| A: There are 15 trees originally. Then there were 21 trees after some more were planted. So there must have been 21 − 15 = 6. The answer is 6. |
| Q: If there are 3 cars in the parking lot and 2 more cars arrive, how many cars are in the parking lot? |
| A: There are originally 3 cars. 2 more cars arrive. 3 + 2 = 5. The answer is 5. |
| Q: Leah had 32 chocolates and her sister had 42. If they ate 35, how many pieces do they have left in total? |
| A: Originally, Leah had 32 chocolates. Her sister had 42. So in total they had 32 + 42 = 74. After eating 35, they had 74 − 35 = 39. The answer is 39. |
| Q: Jason had 20 lollipops. He gave Denny some lollipops. Now Jason has 12 lollipops. How many lollipops did Jason give to Denny? |
| A: Jason started with 20 lollipops. Then he had 12 after giving some to Denny. So he gave Denny 20 − 12 = 8. The answer is 8 |
| Q: Shawn has five toys. For Christmas, he got two toys each from his mom and dad. How many toys does he have now? |
| A: Shawn started with 5 toys. If he got 2 toys each from his mom and dad, then that is 4 more toys. 5 + 4 = 9. The answer is 9. |
| Q: There were nine computers in the server room. Five more computers were installed each day, from monday to thursday. How many computers are now in the server room? |
| A: There were originally 9 computers. For each of 4 days, 5 more computers were added. So 5 * 4 = 20 computers were added. 9 + 20 is 29. The answer is 29. |
| Q: Michael had 58 golf balls. On tuesday, he lost 23 golf balls. On wednesday, he lost 2 more. How many golf balls did he have at the end of wednesday? |
| A: Michael started with 58 golf balls. After losing 23 on tuesday, he had 58 − 23 = 35. After losing 2 more, he had 35 − 2 = 33 golf balls. The answer is 33. |
| Q: Olivia has $23. She bought five bagels for $3 each. How much money does she have left? |
| A: Olivia had 23 dollars. 5 bagels for 3 dollars each will be 5 × 3 = 15 dollars. So she has 23 − 15 dollars left. 23 − 15 is 8. The answer is 8. |

Example Results: Symbolic Reasoning

Second, example results are presented for performing symbolic reasoning tasks. Although the symbolic reasoning tasks discussed here are generally simple for humans, machine-learned models can typically exhibit a flat scaling curve for such tasks. In some examples shown here, solving intermediate steps of a symbolic reasoning task according to aspects of the present disclosure using chain of thought prompting allows models to perform tasks that are not solvable with standard prompting alone.

Three tasks are presented herein for the sake of illustration of symbolic manipulation functions: Last letter concatenation (to concatenate the last letters of words in randomly concatenated names from the top one-thousand first and last names from name census data); Reverse list (to reverse the order of a list of randomly sampled names of everyday objects); and Coin flip (to answer whether a coin is still heads up after people either flip or do not flip the coin).

For each task a test set is split into an in-domain test set for which examples had the same number of steps as the training/few-shot exemplars, as well as two out-of-domain (OOD) test sets, for which evaluation examples had more steps than those in the exemplars. For last letter concatenation, the model only sees exemplars of names with two words, and then performs last letter concatenation on names with three and four words. The same is done for the number of items in the reverse list task (in-domain=5, OOD={6, 7}) and the number of potential flips in the coin flip task (in-domain=2, OOD={3, 4}).

Figure 8:
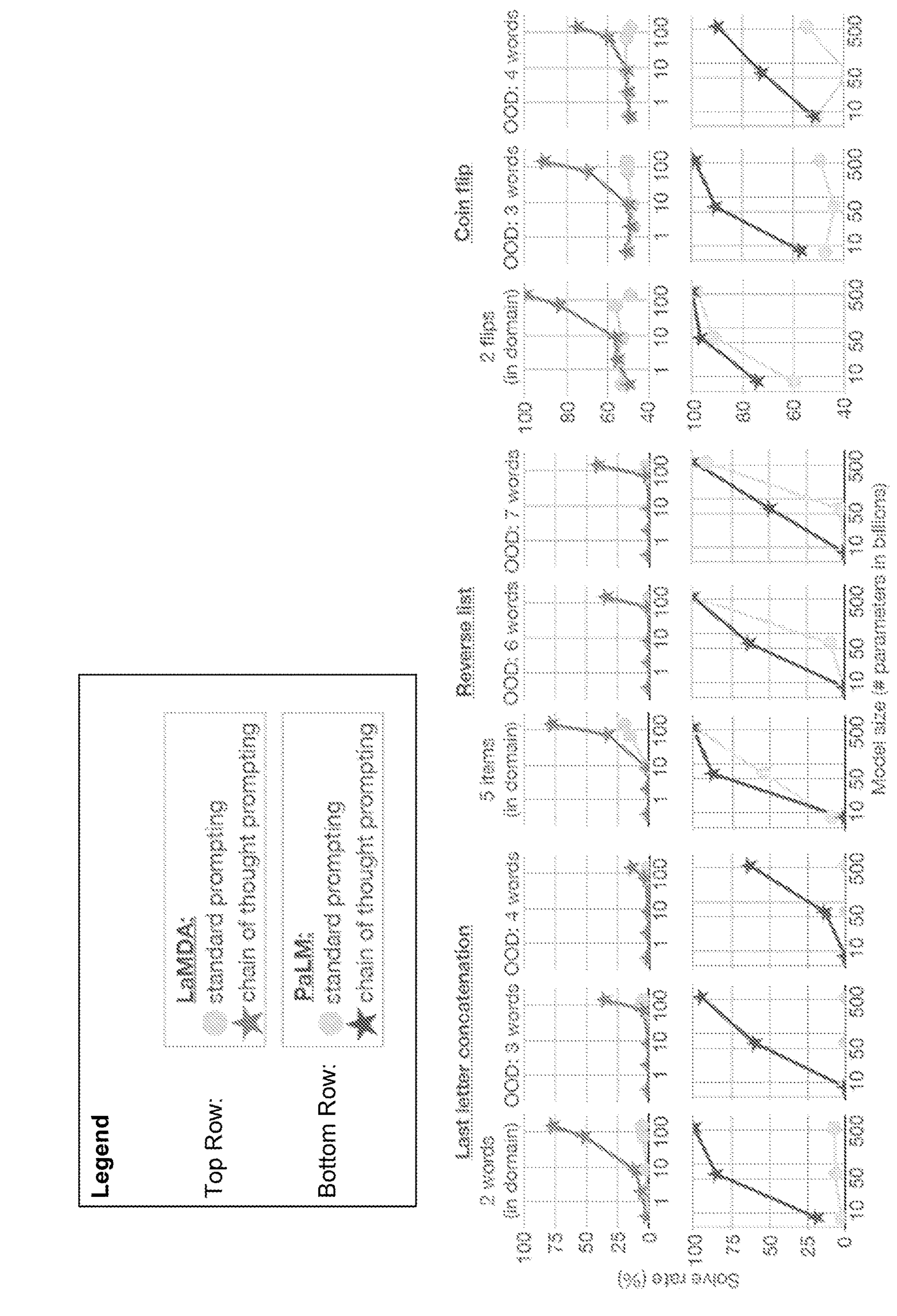
FIG. 8 depicts example results for benchmark comparisons for chain of thought prompting according to example aspects of some embodiments of the present disclosure.

Example results are given in FIG. 8.

TABLE 2

| Few-shot exemplars for full chain of thought prompt for the last letter concatenation task. |
| --- |
| Q: Take the last letters of the words in "Elon Musk" and concatenate them. |
| A: The last letter of "Elon" is "n". The last letter of "Musk" is "k". Concatenating them is "nk". The answer is nk. |
| Q: Take the last letters of the words in "Larry Page" and concatenate them. |
| A: The last letter of "Larry" is "y". The last letter of "Page" is "e". Concatenating them is "ye". The answer is ye. |
| Q: Take the last letters of the words in "Sergey Brin" and concatenate them. |
| A: The last letter of "Sergey" is "y". The last letter of "Brin" is "n". Concatenating them is "yn". The answer is yn. |
| Q: Take the last letters of the words in "Bill Gates" and concatenate them. |
| A: The last letter of "Bill" is "l". The last letter of "Gates" is "s". Concatenating them is "ls". The answer is ls. |

TABLE 3

| Few-shot exemplars for chain of thought prompt for the reverse list task. |
| --- |
| Q: Reverse the sequence "cigar, umbrella, key, gum, alarm". |
| A: First is cigar. Second is umbrella. Third is key. Fourth is gum. Fifth is alarm. Now to reverse, change the order to: Fifth is alarm. Fourth is gum. Third is key. Second is umbrella. First is cigar. So the answer is "alarm, gum, key, umbrella, cigar". |
| Q: Reverse the sequence "player, passport, umbrella, bottle, watch". |
| A: First is player. Second is passport. Third is umbrella. Fourth is bottle. Fifth is watch. Now to reverse, change the order to: Fifth is watch. Fourth is bottle. Third is umbrella. Second is passport. First is player. So the answer is "watch, bottle, umbrella, passport, player". |
| Q: Reverse the sequence "coin, postcard, case, pen, wallet". |
| A: First is coin. Second is postcard. Third is case. Fourth is pen. Fifth is wallet. Now to reverse, change the order to: Fifth is wallet. Fourth is pen. Third is case. Second is postcard. First is coin. So the answer is "wallet, pen, case, postcard, coin". |
| Q: Reverse the sequence "laptop, lipstick, pen, bin, clock". |
| A: First is laptop. Second is lipstick. Third is pen. Fourth is bin. Fifth is clock. Now to reverse, change the order to: Fifth is clock. Fourth is bin. Third is pen. Second is lipstick. First is laptop. So the answer is "clock, bin, pen, lipstick, laptop". |
| Q: Reverse the sequence "key, pen, screen, file, cigar". |
| A: First is key. Second is pen. Third is screen. Fourth is file. Fifth is cigar. Now to reverse, change the order to: Fifth is cigar. Fourth is file. Third is screen. Second is pen. First is key. So the answer is "cigar, file, screen, pen, key" |
| Q: Reverse the sequence "card, stamp, book, water, glasses". |
| A: First is card. Second is stamp. Third is book. Fourth is water. Fifth is glasses. Now to reverse, change the order to: Fifth is glasses. Fourth is water. Third is book. Second is stamp. First is card. The answer is 29. |
| Q: Reverse the sequence "clock, coin, bottle, head, postcard". |
| A: First is clock. Second is coin. Third is bottle. Fourth is head. Fifth is postcard. Now to reverse, change the order to: Fifth is postcard. Fourth is head. Third is bottle. Second is coin. First is clock. So the answer is "postcard, head, bottle, coin, clock". |
| Q: Reverse the sequence "battery, glasses, lighter, water, scissors". |
| A: First is battery. Second is glasses. Third is lighter. Fourth is water. Fifth is scissors. Now to reverse, change the order to: Fifth is scissors. Fourth is water. Third is lighter. Second is glasses. First is battery. So the answer is "scissors, water, lighter, glasses, battery". |

TABLE 4

| Few-shot exemplars for full chain of thought prompt for the coinflip task. |
| --- |
| Q: A coin is heads up. Ka flips the coin. Sherrie flips the coin. Is the coin still heads up? |
| A: The coin was flipped by Ka and Sherrie. So the coin was flipped 2 times, which is an even number. The coin started heads up, so after an even number of flips, it will still be heads up. So the answer is yes. |
| Q: A coin is heads up. Jamey flips the coin. Teressa flips the coin. Is the coin still heads up? |
| A: The coin was flipped by Jamey and Teressa. So the coin was flipped 2 times, which is an even number. The coin started heads up, so after an even number of flips, it will still be heads up. So the answer is yes. |
| Q: A coin is heads up. Maybelle flips the coin. Shalonda does not flip the coin. Is the coin still heads up? |
| A: The coin was flipped by Maybelle. So the coin was flipped 1 time, which is an odd number. The coin started heads up, so after an odd number of flips, it will be tails up. So the answer is no. |
| Q: A coin is heads up. Millicent does not flip the coin. Conception flips the coin. Is the coin still |

TABLE 4-continued

| Few-shot exemplars for full chain of thought prompt for the coinflip task. |
|---|
| heads up?<br>A: The coin was flipped by Conception. So the coin was flipped 1 time, which is an odd number. The coin started heads up, so after an odd number of flips, it will be tails up. So the answer is no.<br>Q: A coin is heads up. Sal flips the coin. Raymond does not flip the coin. Is the coin still heads up?<br>A: The coin was flipped by Sal. So the coin was flipped 1 time, which is an odd number. The coin started heads up, so after an odd number of flips, it will be tails up. So the answer is no.<br>Q: A coin is heads up. Conception flips the coin. Kristian does not flip the coin. Is the coin still heads up?<br>A: The coin was flipped by Conception. So the coin was flipped 1 time, which is an odd number. The coin started heads up, so after an odd number of flips, it will be tails up. So the answer is no.<br>Q: A coin is heads up. Inga does not flip the coin. Elanor does not flip the coin. Is the coin still heads up?<br>A: The coin was flipped by no one. So the coin was flipped 0 times. The coin started heads up, and it was not flipped, so it is still heads up. So the answer is yes.<br>Q: A coin is heads up. Ryan flips the coin. Shaunda flips the coin. Is the coin still heads up?<br>A: The coin was flipped by Ryan and Shaunda. So the coin was flipped 2 times, which is an even number. The coin started heads up, so after an even number of flips, it will still be heads up. So the answer is yes. |

Example Results: "Common Sense" Reasoning

Third, example results are presented for tasks of reasoning about physical and human interactions under the presumption of general background knowledge. Four benchmark datasets are selected for the example results:

(1) CommonsenseQA (Talmor et al., *CommonsenseQA: A question answering challenge targeting commonsense knowledge*, In Proceedings of the 2019 Conference of the North American Chapter of the Association for Computational Linguistics: Human Chain of Thought Prompting Elicits Reasoning in Large Language Models Language Technologies, Volume 1 (Long and Short Papers), 2019. doi: 10.18653/v1/N19-1421) includes commonsense reasoning questions about the world involving complex semantics that often require prior knowledge;

(2) StrategyQA (Geva et al., *Did aristotle use a laptop? A question answering benchmark with implicit reasoning strategies*, Transactions of the Association for Computational Linguistics, 2021. doi: 10.1162/tacl_a_00370) includes inference of a multi-hop strategy to answer questions;

(3) Date Understanding, which involves inferring a date from a given context; and (4) Sports Understanding, which involves determining whether a sentence relating to sports is plausible or implausible;

with (3) and (4) from (BIG-bench collaboration, https://github.com/google/BIG-bench).

Figure 9:
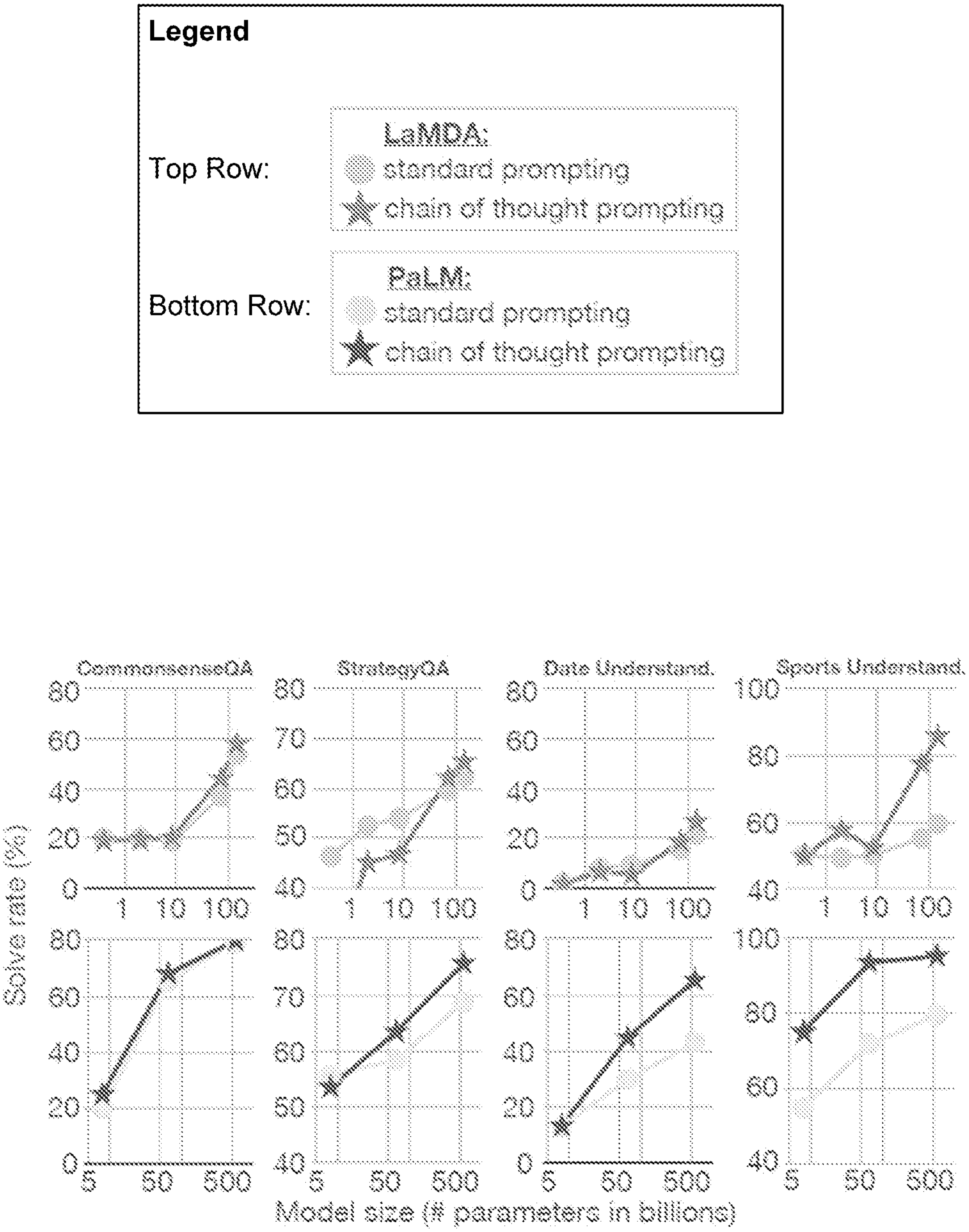
FIG. 9 depicts example results for benchmark comparisons for chain of thought prompting according to example aspects of some embodiments of the present disclosure.

Example results are given in FIG. 9.

TABLE 5

| Few-shot exemplars for full chain of thought prompt for CommonsenseQA. |
|---|
| Q: What do people use to absorb extra ink from a fountain pen? Answer Choices: (a) shirt pocket (b) calligrapher's hand (c) inkwell (d) desk drawer (e) blotter<br>A: The answer must be an item that can absorb ink. Of the above choices, only blotters are used to absorb ink. So the answer is (e).<br>Q: What home entertainment equipment requires cable? Answer Choices: (a) radio shack (b) substation (c) television (d) cabinet<br>A: The answer must require cable. Of the above choices, only television requires cable. So the answer is (c).<br>Q: The fox walked from the city into the forest, what was it looking for? Answer Choices: (a) pretty flowers (b) hen house (c) natural habitat (d) storybook<br>A: The answer must be something in the forest. Of the above choices, only natural habitat is in the forest. So the answer is (b).<br>Q: Sammy wanted to go to where the people were. Where might he go? Answer Choices: (a) populated areas (b) race track (c) desert (d) apartment (e) roadblock<br>A: The answer must be a place with a lot of people. Of the above choices, only populated areas have a lot of people. So the answer is (a).<br>Q: Where do you put your grapes just before checking out? Answer Choices: (a) mouth (b) grocery cart (c) super market (d) fruit basket (e) fruit market<br>A: The answer should be the place where grocery items are placed before checking out. Of the above choices, grocery cart makes the most sense for holding grocery items. So the answer is (b).<br>Q: Google Maps and other highway and street GPS services have replaced what? Answer Choices: (a) united states (b) mexico (c) countryside (d) atlas<br>A: The answer must be something that used to do what Google Maps and GPS services do, which is to give directions. Of the above choices, only atlases are used to give directions. So the |

TABLE 5-continued

| Few-shot exemplars for full chain of thought prompt for CommonsenseQA. |
|---|
| answer is (d).<br>Q: Before getting a divorce, what did the wife feel who was doing all the work? Answer Choices: (a) harder (b) anguish (c) bitterness (d) tears (e) sadness<br>A: The answer should be the feeling of someone getting divorced who was doing all the work. Of the above choices, the closest feeling is bitterness. So the answer is (c). |

TABLE 6

| Few-shot exemplars for full chain of thought prompt for StrategyQA. |
|---|
| Q: Do hamsters provide food for any animals?<br>A: Hamsters are prey animals. Prey are food for predators. Thus, hamsters provide food for some animals. So the answer is yes.<br>Q: Could Brooke Shields succeed at University of Pennsylvania?<br>A: Brooke Shields went to Princeton University. Princeton University is about as academically rigorous as the University of Pennsylvania. Thus, Brooke Shields could also succeed at the University of Pennsylvania. So the answer is yes.<br>Q: Yes or no: Hydrogen's atomic number squared exceeds number of Spice Girls?<br>A: Hydrogen has an atomic number of 1. 1 squared is 1. There are 5 Spice Girls. Thus, Hydrogen's atomic number squared is less than 5. So the answer is no.<br>Q: Yes or no: Is it common to see frost during some college commencements?<br>A: College commencement ceremonies can happen in December, May, and June. December is in the winter, so there can be frost. Thus, there could be frost at some commencements. So the answer is yes.<br>Q: Yes or no: Could a llama birth twice during War in Vietnam (1945-46)?<br>A: The War in Vietnam was 6 months. The gestation period for a llama is 11 months, which is more than 6 months. Thus, a llama could not give birth twice during the War in Vietnam. So the answer is no.<br>Q: Yes or no: Would a pear sink in water?<br>A: The density of a pear is about 0.6 g = cm3, which is less than water. Objects less dense than water float. Thus, a pear would float. So the answer is no. |

TABLE 7

| Few-shot exemplars for full chain of thought prompt for Date Understanding. |
|---|
| Q: 2015 is coming in 36 hours. What is the date one week from today in MM/DD/YYYY?<br>A: If 2015 is coming in 36 hours, then it is coming in 2 days. 2 days before 01/01/2015 is 12/30/2014, so today is 12/30/2014. So one week from today will be 01/05/2015. So the answer is 01/05/2015.<br>Q: The first day of 2019 is a Tuesday, and today is the first Monday of 2019. What is the date today in MM/DD/YYYY?<br>A: If the first day of 2019 was Tuesday, then 01/01/2019 was a Tuesday. Today is the first monday, would be six days later. So today is 01/07/2019. So the answer is 01/07/2019.<br>Q: The concert was scheduled to be on 06/01/1943, but was delayed by one day to today. What is the date 10 days ago in MM/DD/YYYY?<br>A: One day after 06/01/1943 is 06/02/1943, so today is 06/02/1943. 10 days before today is 05/23/1943. So the answer is 05/23/1943.<br>Q: It is 4/19/1969 today. What is the date 24 hours later in MM/DD/YYYY?<br>A: Today is 04/19/1969. 24 hours later is one day after today, which would be 04/20/1969. So the answer is 04/20/1969.<br>Q: Jane thought today is 3/11/2002, but today is in fact Mar 12, which is 1 day later. What is the date 24 hours later in MM/DD/YYYY?<br>A: Today is 03/12/2002. So the date 24 hours later will be 03/13/2002. So the answer is 03/13/2002.<br>Q: Jane was born on the last day of Feburary in 2001. Today is her 16-year-old birthday. What is the date yesterday in MM/DD/YYYY?<br>A: The last day of February is the 28th, so Jane was born on 02/28/2001. Today is her 16-year old birthday, so today is 02/28/2017. So yesterday was 02/27/2017. So the answer is 02/27/2017. |

TABLE 8

| Few-shot exemplars for full chain of thought prompt for Sports Understanding. |
|---|
| Q: Is the following sentence plausible? "Kyle Palmieri was called for slashing."<br>A: Kyle Palmieri is a hockey player. Being called for slashing is part of hockey. So the answer is yes.<br>Q: Is the following sentence plausible? "Joao Moutinho caught the screen pass in the NFC championship."<br>A: Joao Moutinho is a soccer player. The NFC championship is part of American football, not soccer. So the answer is no.<br>Q: Is the following sentence plausible? "Carson Wentz set the pick and roll."<br>A: Carson Wentz is an American football player. Pick and roll is part of basketball, not football. So the answer is no.<br>Q: Is the following sentence plausible? "Jonas Valanciunas beat the buzzer."<br>A: Jonas Valanciunas is a basketball player. Beating the buzzer is part of basketball. So the answer is yes.<br>Q: Is the following sentence plausible? "Jamel Murray was perfect from the line."<br>A: Jamal Murray is a basketball player. Being perfect from the line is part of basketball. So the answer is yes.<br>Q: Is the following sentence plausible? "Sam Darnold passed the puck."<br>A: Sam Darnold is a American football player. Passing the puck is part of hockey, not American football. So the answer is no.<br>Q: Is the following sentence plausible? "Draymond Green threw a touchdown."<br>A: Draymond Green is an basketball player. Throwing a touchdown is part of football, not basketball. So the answer is no.<br>Q: Is the following sentence plausible? "Malcolm Brogdon banked the shot in."<br>A: Malcolm Brogdon is a basketball player. Banking the shot in is part of basketball. So the answer is yes. |

Example Results: Self-Consistency

Example results for an example self-consistency technique according to the present disclosure is provided over the following reasoning benchmarks:

(1) Arithmetic reasoning: GSM8K, AddSub, MultiArith, and ASDiv from above, as well as AQUA-RAT (Ling et al., *Program induction by rationale generation: Learning to solve and explain algebraic word problems*, In Proceedings of the 55th Annual Meeting of the Association for Computational Linguistics (Volume 1: Long Papers), 2017. doi:10.18653/v1/P17-1015) and SVAMP (Patel et al., *Are NLP models really able to solve simple math word problems*?, In Proceedings of the 2021 Conference of the North American Chapter of the Association for Computational Linguistics: Human Language Technologies, pp. 2080-2094).

(2) Commonsense reasoning: CommonsenseQA and StrategyQA (Geva et al., 2021) for open-domain question-answering with implicit multi-hop reasoning, and the AI2 Reasoning Challenge (ARC) (Clark et al., *Think you have solved question answering? Try arc, the AI2 reasoning challenge*, ArXiv, abs/1803.05457, 2018.).

Example self-consistency techniques were used to obtain results over the following dense left-to-right, decoder-only transformer language models with varying scales:

(1) LaMDA-PT from above with 137-billion parameters, pretrained on a mixture of web documents, dialog data and Wikipedia™; and (2) PaLM from above with 540-billion parameters, pretrained on a high quality corpus of 780 billion tokens with filtered webpages, books, Wikipedia™, news articles, source code, and social media conversations.

For the following example results, the same set of prompts presented above are used. Sampling scheme.

To sample diverse reasoning paths, for LaMDA-137B temperature sampling was used with T=0.5 and truncated at the top-k (k=40) tokens with the highest probability, and for PaLM-540B T=0.7, k=40. Example techniques of self-consistency according to the present disclosure can be generally robust to sampling strategies and parameters. For sampled results, the results are averaged over 10 runs, where 40 outputs are sampled independently from the decoder in each run. Greedy decoding a single chain of thought (e.g., as in previous examples) is provided for comparison.

State-of-the-art results can be obtained on almost all tasks: despite the fact that self-consistency is unsupervised and task-agnostic, these results compare favorably to more costly existing approaches that require task-specific training, or fine-tuning with thousands of examples (e.g., on GSM8K). Example results are provided for arithmetic reasoning in Table 9a. Example results on commonsense reasoning tasks are given in Table 9b.

TABLE 9a

Arithmetic reasoning results.

| | Method | AddSub | MultiArith | ASDiv | AQuA | SVAMP | GSM8K |
|---|---|---|---|---|---|---|---|
| | Previous SoTA | **94.9**[a] | 60.5[a] | 75.3[b] | 37.9[c] | 57.4[d] | 35[e]/57[g] |
| LaMDA | Greedy decode (Single-path) | 52.9 | 51.8 | 49.0 | 17.7 | 38.9 | 17.1 |
| (137B) | Self-Consistency (Multi-path) | 63.5 (+10.6) | 75.7 (+23.9) | 58.2 (+9.2) | 26.8 (+9.1) | 53.3 (+14.4) | 27.7 (+10.6) |
| PaLM | Greedy decode (Single-path) | 91.9 | 94.7 | 74.0 | 35.8 | 79.0 | 56.5 |
| (540B) | Self-Consistency (Multi-path) | 93.7 (+1.8) | **99.3** (+4.6) | **81.9** (+7.9) | **48.3** (+12.5) | **86.6** (+7.6) | **74.4** (+17.9) |

TABLE 9b

Common Sense Reasoning Results.

| | Method | CommonsenseQA | StrategyQA | ARC (Easy) | ARC (Challenge) |
|---|---|---|---|---|---|
| | Previous SoTA | 91.2[a] | 73.9[b] | 86.4[c] | 75.0[c] |
| LaMDA | Greedy decode (Single-path) | 57.9 | 65.4 | 75.3 | 55.1 |
| (137B) | Self-Consistency (Multi-path) | 63.1 (+5.2) | 67.8 (+2.4) | 79.3 (+4 0) | 59.8 (+4.7) |
| PaLM | Greedy decode (Single-path) | 79.0 | 75.3 | 95.3 | 85.2 |
| (540B) | Self-Consistency (Multi-path) | 80.7 (+1.7) | 81.6 (+6.3) | 96.4 (+1.1) | 88.7 (+3.5) |

Example Results: Query Recursion

Example results are provided for the last-letter concatenation task. In this example task, the query includes a list of words, and the response is the concatenation of the last letters of the words in the list. For example, “thinking, machine” outputs “ge” since the last letter of “thinking” is “g” and the last letter of “machine” is “e”. The experiment setup is as follows: (1) only two demonstration examples are provided; and (2) the lists in training contain at most three words, while the lists for testing can be arbitrarily long. Although this task is straightforward for humans, it is extremely challenging for statistical machine learning methods. First, machine learning models trained with only two examples are not expected to generalize well. Second, the length-based train and test split requires out-of-distribution generalization, which is highly non-trivial for statistical learning.

The initial instructive sequences used for the Chain of Thought example and the Query Recursion example are provided in Table 10. Testing lists with lengths from 4 to 12 words were sampled from Wiktionary. For each length, 500 lists are constructed. Example results are given in Table 11.

TABLE 10

Chain-of-thought and Query Recursion prompts for the example last letter concatenation task. Prompts for the naïve baseline are simply input/output pairs.

| Chain of Thought | Query Recursion |
|---|---|
| Q: “think, machine”<br>A: The last letter of “think” is “k”. The last letter of “machine” is “e”. Concatenating “k”, “e” leads to “ke”. So, “think, machine” outputs ”ke”.<br>Q: “learning, reasoning, generalization”<br>A: The last letter of “learning” is “g”. The last letter of “reasoning” is “g”. The last letter of “generalization” is “n”. Concatenating “g”, “g”, “n” leads to “ggn”. So, “learning, reasoning, generalization” outputs ”ggn”. | Q: “think, machine”<br>A: The last letter of “think” is “k”. The last letter of “machine” is “e”. Concatenating “k”, “e” leads to “ke”. So, “think, machine” outputs “ke”.<br>Q: “think, machine, learning”<br>A: “think, machine” outputs ”ke”. The last letter of “learning” is “g”. Concatenating “ke”, “g” leads to “keg”. So, “think, machine, learning” outputs “keg”. |

TABLE 11

Accuracy of different prompting methods with code-davinci-002 on the last-letter-concatenation task with the length of lists increasing from 4 to 12.

| Method | L = 4 | L = 6 | L = 8 | L = 10 | L = 12 |
|---|---|---|---|---|---|
| Naïve Prompting | 0.0 | 0.0 | 0.0 | 0.0 | 0.0 |
| Chain of Thought | 89.4 | 75.0 | 51.8 | 39.8 | 33.6 |
| Query Recursion | 94.0 | 88.4 | 83.0 | 76.4 | 74.0 |

Example results are also provided for the SCAN benchmark (Lake & Baroni, 2018). This benchmark relates to mapping natural language commands to sequences of actions. For this example, all the prompting methods share the same commands, but Naïve Prompting directly maps commands to action sequences without explanations, and Chain of Thought uses the same command-mapping prompts as Query Recursion, except without command reduction. Example results are given in Table 12.

TABLE 12

Accuracies (%) of different prompting methods on the test set of SCAN under the length-based split. The results of text-davinci-002 are based on a random subset of 100 commands.

| Method | code-davinci-002 | code-davinci-001 | text-davinci-002 |
|---|---|---|---|
| Naïve Prompting | 16.7 | 0.4 | 6.0 |
| Chain of Thought | 16.2 | 0.0 | 0.0 |
| Query Recursion | 99.7 | 60.7 | 76.0 |

Example results are also provided for the DROP benchmark. This benchmark relates to reading comprehension and numerical reasoning. All prompting methods for these example results take 3 shot prompts. An example set of prompts for Query Recursion prompting is shown in Table 13, where the prompt on the left column shows how a problem is reduced to subproblems, and the prompt on the right column shows how the subproblems are sequentially solved. Prompts for Chain of Thought here were generated by merging Query Recursion prompts for subproblems, and prompts for Naïve Prompting were generated from the Chain of Thought prompts by removing reasoning chains. Example results are given in Table 14.

TABLE 13

Example prompts for Query Recursion Example.

| Example Query Breakdown Prompt | Example Query Recursion Prompt |
|---|---|
| Q: The gender distribution of the population was 50.2% male and 49.8% female. Of the adult population, 29 people or 14.6% of the population are between 20 and 29 years old. 28 people or 14.1% are 30 to 39, 36 people or 18.2% are 40 to 49, and 31 people or 15.7% are 50 to 59. How many percent of people are not 40 to 49?<br>A: To answer the question "How many percent of people are not 40 to 49?', we need to know "How many percent of people are 40 to 49?" | The gender distribution of the population was 50.2% male and 49.8% female. Of the adult population, 29 people or 14.6% of the population are between 20 and 29 years old. 28 people or 14.1% are 30 to 39, 36 people or 18.2% are 40 to 49, and 31 people or 15.7% are 50 to 59.<br>Q: How many percent of people are 40 to 49?<br>A: "36 people or 18.2% are 40 to 49". So the answer is 18.2%.<br>Q: How many percent of people are not 40 to 49?<br>A: We know that 18.2% are 40 to 49. So 100% − 18.2% = 81.8% are not 40 to 49. So the answer is 81.8%. |

TABLE 14

Accuracies (%) of different prompting methods on the test set of SCAN under the length-based split. The results of text-davinci-002 are based on a random subset of 100 commands.

| | Non-Football (3988 cases) | | Football (1862 cases) | |
|---|---|---|---|---|
| Method | code-davinci-002 | PaLM | code-davinci-002 | PaLM |
| Zero-shot | 43.86 | 48.42 | 51.77 | 44.95 |
| Naïve Prompting | 58.78 | 56.54 | 62.73 | 60.47 |
| Chain of Thought | 74.77 | 63.84 | 59.56 | 67.35 |
| Query Recursion | 82.45 | 79.24 | 73.42 | 69.98 |

Example Devices and Systems

Figure 10A:
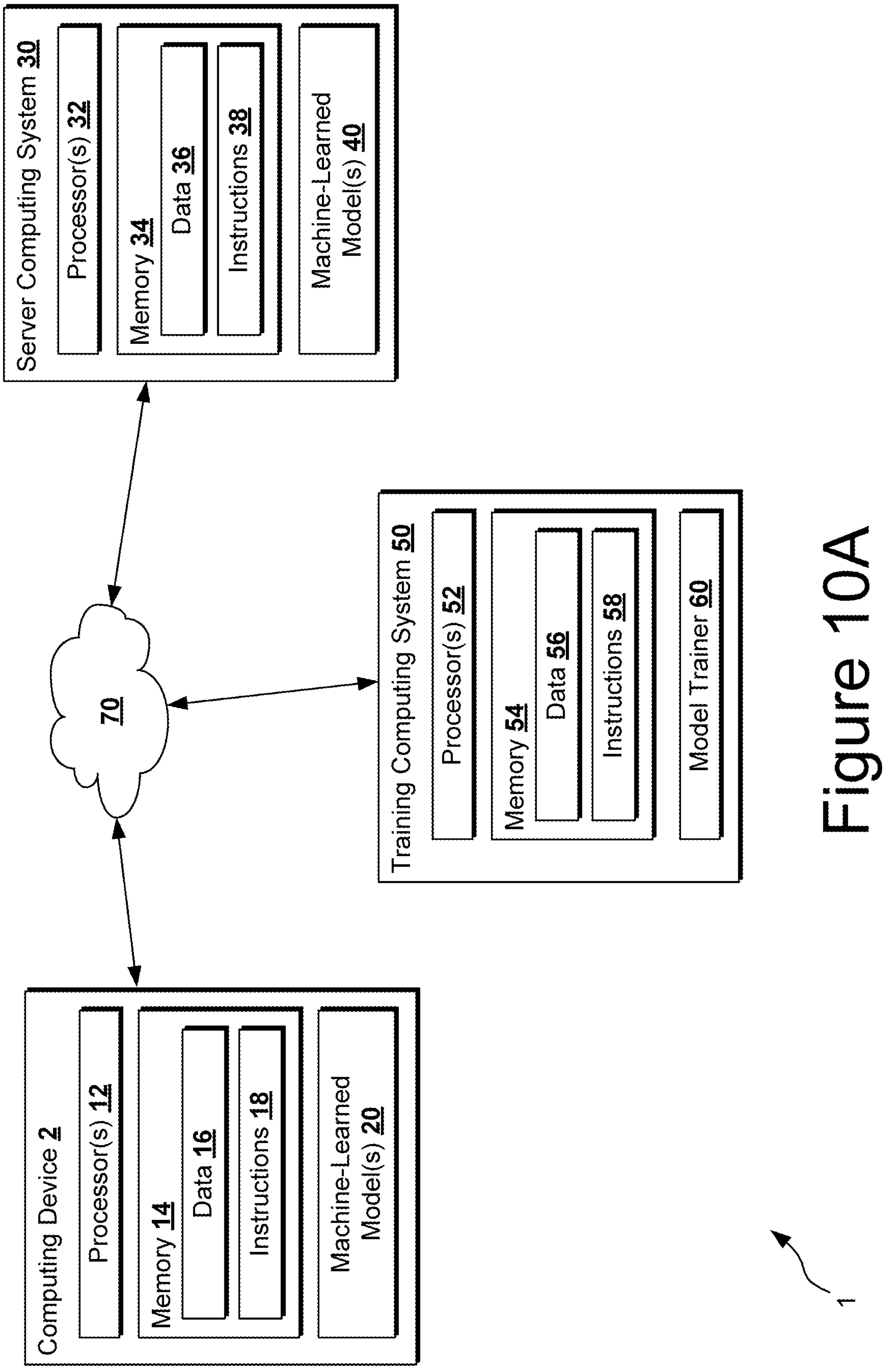
FIG. 10A depicts a block diagram of an example computing system that performs chain of thought prompting according to example aspects of some embodiments of the present disclosure.

FIG. 10A depicts a block diagram of an example computing system 1 that can generate or implement input data structures and self-consistency output sampling according to example embodiments of the present disclosure. The system 1 includes a computing device 2, a server computing system 30, and a training computing system 50 that are communicatively coupled over a network 70.

The computing device 2 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to perform operations implementing input data structures and self-consistency output sampling according to example embodiments of the present disclosure, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20.

Additionally, or alternatively, one or more machine-learned models 40 can be included in or otherwise stored and implemented by the server computing system 30 that communicates with the computing device 2 according to a client-server relationship.

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model (s) can process the image data to generate an upscaled image data output. As another example, the machine-learned model (s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some embodiments, the machine-learned models 40 can be implemented by the server computing system 40 as a portion of a web service (e.g., remote machine-learned model hosting service, such as an online interface for performing machine-learned model operations over a network on remote servers 30). For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations (e.g., to perform operations implementing input data structures and self-consistency output sampling according to example embodiments of the present disclosure, etc.).

In some implementations, the server computing system 30 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 2 or the server computing system 30 can train example embodiments of a machine-learned model (e.g., including models 20 or 40) using a pretraining pipeline (e.g., an unsupervised pipeline, a semi-supervised pipeline, etc.). In some embodiments, the computing device 2 or the server computing system 30 can train example embodiments of a machine-learned model (e.g., including models 20 or 40) using a pretraining pipeline by interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations (e.g., to perform operations implementing input data structures and self-consistency output sampling according to example embodiments of the present disclosure, etc.). In some implementations, the training computing system 50 includes or is otherwise implemented by one or more server computing devices.

The model trainer 60 can include a pretraining pipeline for training machine-learned models using various objectives. Parameters of the image-processing model(s) can be trained, in some embodiments, using various training or learning techniques, such as, for example, backwards propagation of errors. For example, an objective or loss can be backpropagated through the pretraining pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pretraining pipeline can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 10A illustrates one example computing system that can be used to implement the present disclosure. Other computing systems can be used as well. For example, in some implementations, the computing device 2 can include the model trainer 60. In some implementations, the computing device 2 can implement the model trainer 60 to personalize the model(s) based on device-specific data.

Figure 10B:
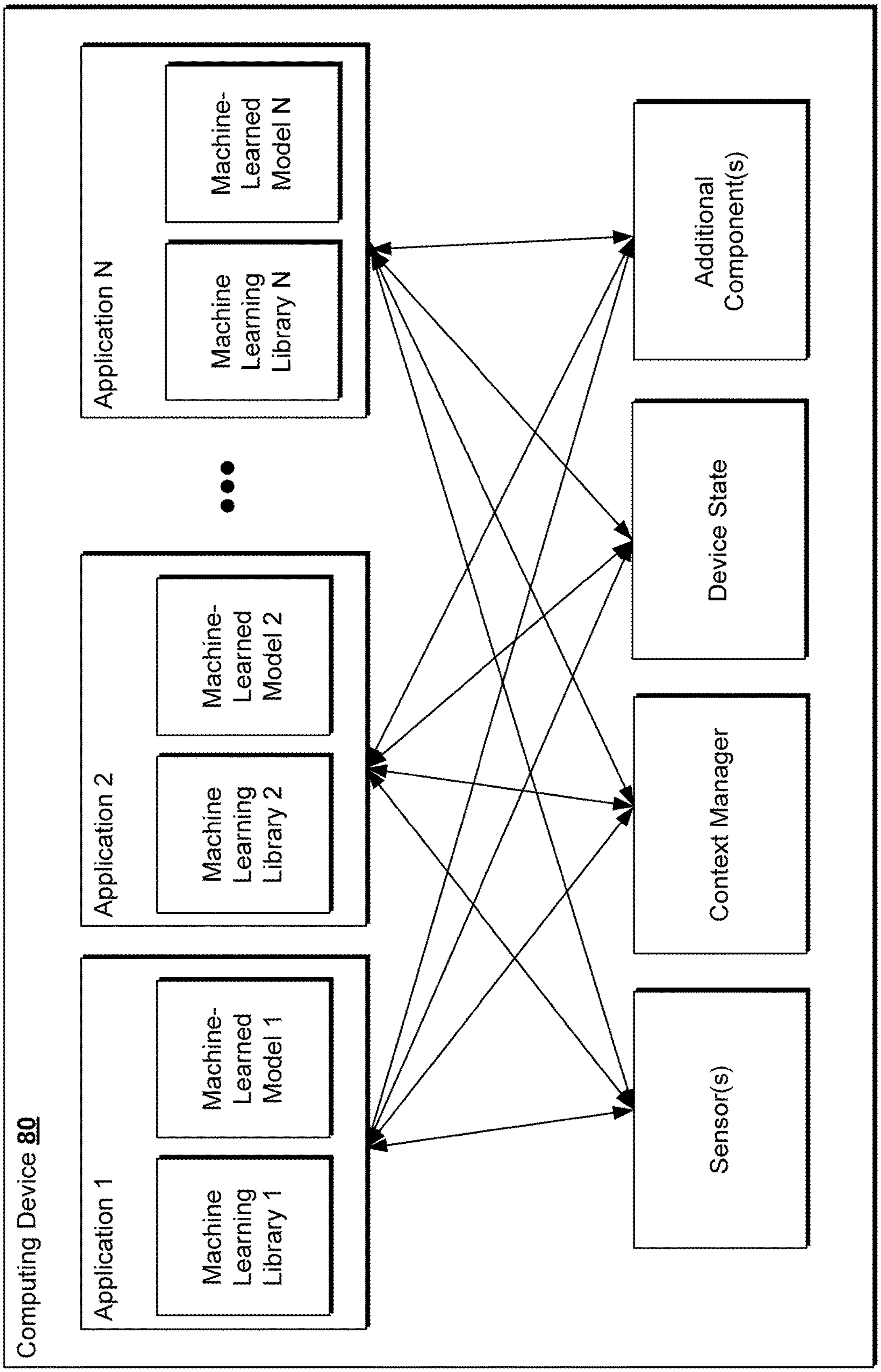
FIG. 10B depicts a block diagram of an example computing device that performs chain of thought prompting according to example aspects of some embodiments of the present disclosure.

FIG. 10B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 10B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 10C:
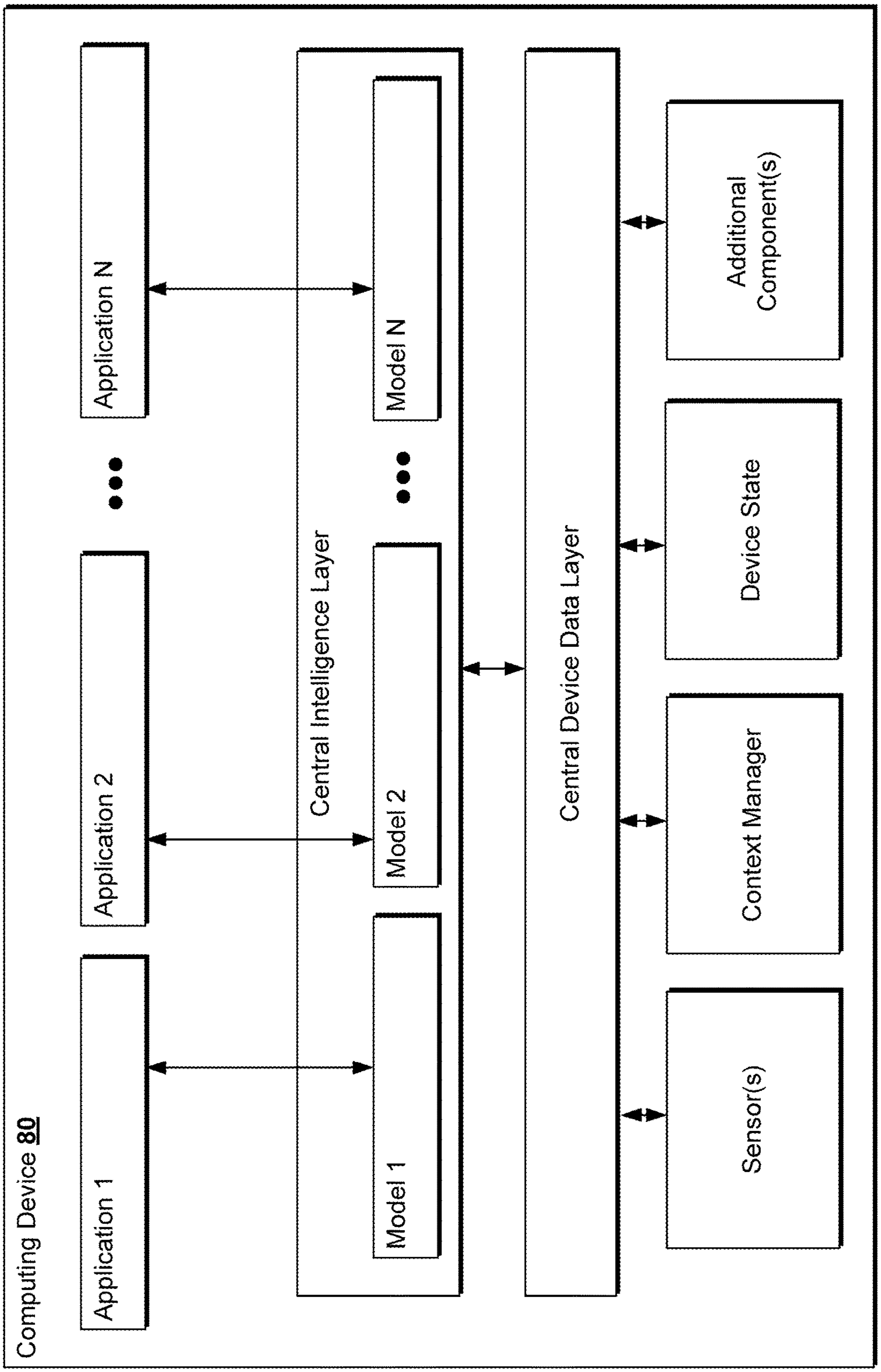
FIG. 10C depicts a block diagram of an example computing device that performs chain of thought prompting according to example aspects of some embodiments of the present disclosure.

FIG. 10C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 10C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 10C, the central device data layer can communicate with a number of other components of the computing device, such as, for example, one or more sensors, a context manager, a device state component, or additional components. In some implementations, the central device data layer can communicate with each device component using an API (e.g., a private API).

Example Methods

Figure 11:
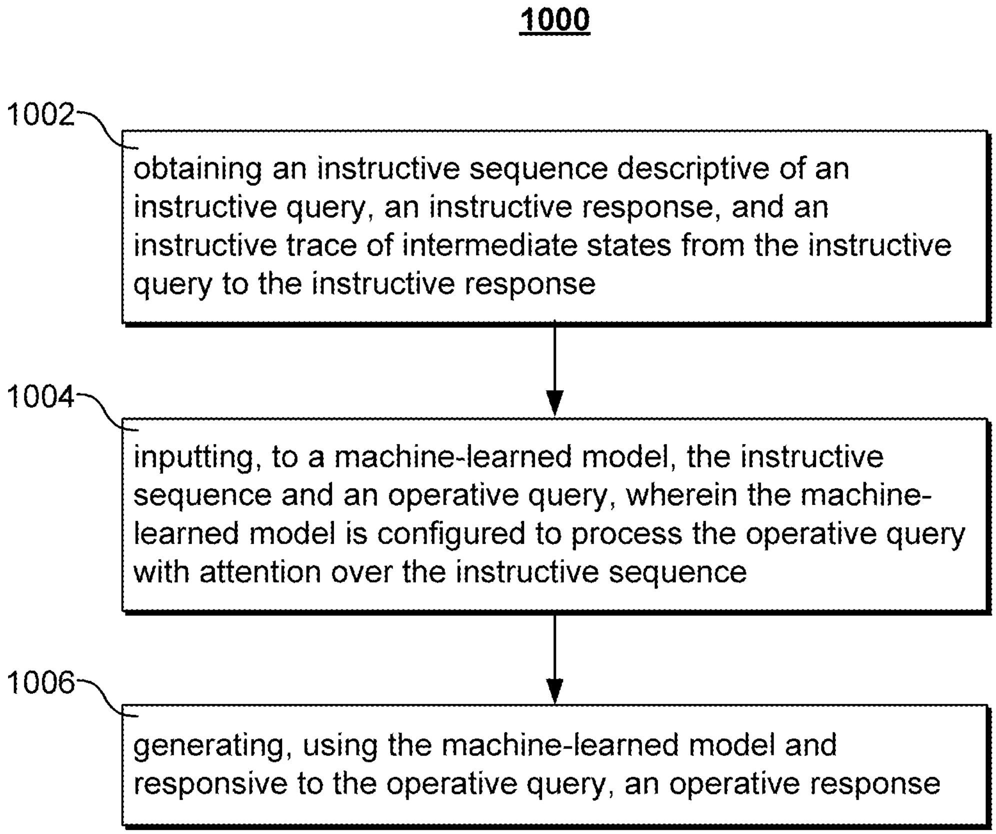
FIG. 11 depicts a flow chart diagram of an example method to perform chain of thought prompting according to example aspects of some embodiments of the present disclosure.

FIG. 11 depicts a flow chart diagram of an example method 1000 to perform according to example embodiments of the present disclosure. Although FIG. 11 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system can obtain an instructive sequence descriptive of an instructive query, an instructive response, and an instructive trace of intermediate states from the instructive query to the instructive response. For example, illustrative instructive queries, responses, and traces are discussed with respect to FIGS. 1 to 4. For instance, in some embodiments, the instructive trace can contain a chain of intermediate states or responses. For example, in some embodiments, the instructive trace can contain a chain of intermediate responses to intermediate queries (e.g., as illustrated in FIGS. 2 to 4).

In some embodiments, the instructive sequence can contain an input flag. For example, an instructive query can contain, for example, an input flag signifying a start of a query (e.g., "Q:"). In some embodiments, the instructive query can also contain an output flag. For instance, an output flag can signify an end of a query or a beginning of a portion of the sequence corresponding to a response to be generated. Example flags are shown in FIGS. 2 to 4 (e.g., "Q:", "A:", "Consider the following Python function", "[BEGIN]", etc.).

In some embodiments, the instructive sequence can include a tokenized representation of natural language (e.g., FIGS. 2, 4, etc.). For instance, the instructive sequence can be obtained by receiving a natural language sequence of words, instructions, questions, explanations, etc. and embedding the sequence into one or more tokens (e.g., word tokens, sub-word tokens, character tokens, etc.). In some embodiments, the instructive sequence can include a tokenized representation of a computer-executable coding language (e.g., FIG. 3). For instance, an instructive sequence can be provided to prompt the machine-learned model to simulate execution of a computer-executable script or program (e.g., to evaluate a final output, to evaluate one or more intermediate states of variables or parameters, etc.).

At 1004, the computing system can input to a machine-learned model, the instructive sequence and an operative query. In some embodiments, the machine-learned model is configured to process the operative query with attention over the instructive sequence. In some embodiments, the instructive sequence can be prepended to the operative query. For example, in some embodiments, the machine-learned model comprises a transformer architecture (e.g., encoder, decoder, etc.) into which the input data structure according to the present disclosure can be input.

At 1006, the computing system can generate, using the machine-learned model and responsive to the operative query, an operative response. In some embodiments, generating the operating response can include generating, using the machine-learned model, a plurality of operative responses. In some embodiments, generating the operating response can include determining the operative response based on a sample of the plurality of operative responses. In some embodiments, the sample is random. In some embodiments, the sample is based on respective probabilities associated with the plurality of operative responses.

In some embodiments, determining the operative response includes determining a consistency metric based on the sample of the plurality of operative responses. For example, a consistency metric can include a self-consistency metric configured to determine internally consistent outputs. In some embodiments, the consistency metric includes a plurality vote (e.g., a vote of output values from one or more operative responses). In some embodiments, the consistency metric includes a majority vote (e.g., a vote of output values from one or more operative responses).

In some embodiments, the method 1000 can include generating, using the machine-learned model and responsive to the operative query, an operative trace of intermediate states from the operative query to the operative response. In some embodiments, the vote (e.g., plurality vote, majority vote, etc.) can be based on a plurality of operative responses respectively associated with a plurality of diverse operative traces.

In some embodiments, the operative query can be a first query component and the operative response can be a first response component, and the method 1000 can include inputting, to the machine-learned model, the instructive sequence, the first query component, the first response component, and a second query component. For instance, the method 1000 can include a query recursion process flow (e.g., as described above with respect to FIG. 5).

For instance, in some embodiments, the method 1000 can include generating using the machine-learned model and responsive to the second query component, a second response component.

For instance, in some embodiments, the method 1000 can include generating, by the computing system and responsive to a target query, one or more query components.

For instance, in some embodiments, the method 1000 can include inputting, to the machine-learned model, a preliminary instructive sequence including a preliminary instructive query and a preliminary instructive response. In some embodiments, the preliminary instructive response includes a plurality of preliminary instructive query components.

For instance, in some embodiments, the method 1000 can include a first query component and a second query component that are generated with a different machine-learned model other than the machine-learned model used to obtain the first response component and the second response component.

For instance, in some embodiments, the method 1000 can include a second query component corresponding to the target query.

For instance, in some embodiments, the method 1000 can include, for a plurality of iterations, one or more generating and inputting operations that build on one another. For instance, in some embodiments, the method 1000 can include, for a plurality of iterations, generating an updated instructive sequence based on combining one or more prior input sequences with one or more output sequences respectively corresponding thereto; inputting, to the machine-learned model, the updated instructive sequence and an additional query component; and generating, using the machine-learned model and responsive to the additional query component, an additional response component.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as “and,” “or,” “but,” etc. It should be understood that such conjunctions are provided for explanatory purposes only. Clauses and other sequences of items joined by a particular conjunction such as “or,” for example, can refer to “and/or,” “at least one of”, “any combination of” example elements listed therein, etc. Also, terms such as “based on” should be understood as “based at least in part on.”

What is claimed is:

1. A computer-implemented method for improved prompting of a machine-learned model, the method comprising:

obtaining, by a computing system comprising one or more processors, an instructive sequence descriptive of an instructive query, an instructive response, and an instructive trace of intermediate states from the instructive query to the instructive response;

inputting, by the computing system and to a machine-learned model, the instructive sequence and an operative query, wherein the machine-learned model is configured to process the operative query with attention over the instructive sequence; and generating, by the computing system, using the machine-learned model and responsive to the operative query, an operative response.

2. The computer-implemented method of claim 1, further comprising:

generating, by the computing system, using the machine-learned model and responsive to the operative query, an operative trace of intermediate states from the operative query to the operative response.

3. The computer-implemented method of claim 2, wherein the instructive trace comprises a chain of intermediate responses to intermediate queries.

4. The computer-implemented method of claim 1, wherein the instructive sequence is prepended to the operative query.

5. The computer-implemented method of claim 1, wherein the instructive sequence comprises an input flag and an output flag.

6. The computer-implemented method of claim 1, wherein the instructive sequence comprises a tokenized representation of a natural language.

7. The computer-implemented method of claim 1, wherein the instructive trace comprises one or more intermediate states of one or more variables declared by a computer-executable coding language.

8. The computer-implemented method of claim 1, wherein generating the operative response comprises:

generating, by the computing system and using the machine-learned model, a plurality of operative responses; and determining, by the computing system, the operative response based on a sample of the plurality of operative responses.

9. The computer-implemented method of claim 8, wherein determining the operative response comprises:

determining, by the computing system, a consistency metric based on the sample of the plurality of operative responses.

10. The computer-implemented method of claim 9, wherein the consistency metric comprises at least one of: a plurality vote, or a majority vote.

11. The computer-implemented method of claim 9, wherein the consistency metric comprises a vote based on operative responses respectively associated with diverse operative traces.

12. The computer-implemented method of claim 8, wherein the sample is based on respective probabilities associated with the plurality of operative responses.

13. The computer-implemented method of claim 1, wherein the operative query is a first query component and the operative response is a first response component, and wherein the method further comprises:

inputting, by the computing system and to the machine-learned model, the instructive sequence, the first query component, the first response component, and a second query component; and generating, by the computing system, using the machine-learned model and responsive to the second query component, a second response component.

14. The computer-implemented method of claim 13, further comprising:

generating, by the computing system and responsive to a target query, one or more query components.

15. The computer-implemented method of claim 14, wherein the second query component corresponds to the target query.

16. The computer-implemented method of claim 13, further comprising:

inputting, by the computing system and to the machine-learned model, a preliminary instructive sequence comprising a preliminary instructive query and a preliminary instructive response, wherein the preliminary instructive response comprises a plurality of preliminary instructive query components.

17. The computer-implemented method of claim 13, wherein the first query component and the second query component are generated with a different machine-learned model other than the machine-learned model used to obtain the first response component and the second response component.

18. The computer-implemented method of claim 13, further comprising, for a plurality of iterations:

generating, by the computing system, an updated instructive sequence based on combining one or more prior input sequences with one or more output sequences respectively corresponding thereto;

inputting, by the computing system and to the machine-learned model, the updated instructive sequence and an additional query component; and generating, by the computing system, using the machine-learned model and responsive to the additional query component, an additional response component.

19. One or more non-transitory memory devices storing computer-readable instructions for improved prompting of a machine-learned model, the instructions executable to cause one or more processors to perform operations, the operations comprising:

obtaining an instructive sequence descriptive of an instructive query, an instructive response, and an instructive trace of intermediate states from the instructive query to the instructive response;

inputting, to a machine-learned model, the instructive sequence and an operative query, wherein the machine-learned model is configured to process the operative query with attention over the instructive sequence; and generating using the machine-learned model and responsive to the operative query, an operative response.

20. The one or more non-transitory memory devices of claim 19, the operations further comprising:

generating, using the machine-learned model and responsive to the operative query, an operative trace of intermediate states from the operative query to the operative response.

21. The one or more non-transitory memory devices of claim 19, wherein generating the operative response comprises:

generating, using the machine-learned model, a plurality of operative responses; and determining the operative response based on a sample of the plurality of operative responses.

22. The one or more non-transitory memory devices of claim 21, wherein determining the operative response comprises:

determining a consistency metric based on the sample of the plurality of operative responses.

23. The one or more non-transitory memory devices of claim 19, wherein the operative query is a first query component and the operative response is a first response component, and wherein the operations comprise:

inputting, to the machine-learned model, the instructive sequence, the first query component, the first response component, and a second query component; and generating using the machine-learned model and responsive to the second query component, a second response component.

24. The one or more non-transitory memory devices of claim 23, the operations further comprising:

generating, responsive to a target query, one or more query components.

25. A computing system for improved prompting of a machine-learned model, the system comprising:

one or more processors; and one or more non-transitory memory devices storing computer-readable instructions that are executable to cause the one or more processors to perform operations, the operations comprising:

obtaining an instructive sequence descriptive of an instructive query, an instructive response, and an instructive trace of intermediate states from the instructive query to the instructive response;

inputting, to a machine-learned model, the instructive sequence and an operative query, wherein the machine-learned model is configured to process the operative query with attention over the instructive sequence; and generating using the machine-learned model and responsive to the operative query, an operative response.

26. The computing system of claim 25, the operations further comprising:

generating, using the machine-learned model and responsive to the operative query, an operative trace of intermediate states from the operative query to the operative response.

27. The computing system of claim 25, wherein generating the operative response comprises:

generating, using the machine-learned model, a plurality of operative responses; and determining the operative response based on a sample of the plurality of operative responses.

28. The computing system of claim 27, wherein determining the operative response comprises:

determining a consistency metric based on the sample of the plurality of operative responses.

29. The computing system of claim 25, wherein the operative query is a first query component and the operative response is a first response component, and wherein the operations comprises:

inputting, to the machine-learned model, the instructive sequence, the first query component, the first response component, and a second query component; and generating using the machine-learned model and responsive to the second query component, a second response component.

30. The computing system of claim 29, the operations further comprising:

generating, responsive to a target query, one or more query components.

* * * * *